US007546679B2

(12) United States Patent
Motherway et al.

(10) Patent No.: US 7,546,679 B2
(45) Date of Patent: Jun. 16, 2009

(54) HIGH SPEED VALVE ASSEMBLY

(75) Inventors: William D. Motherway, Boston, MA (US); Stuart M. Davis, Norfolk, MA (US)

(73) Assignee: The Gillette Company, Boston, MA (US)

( * ) Notice: Subject to any disclaimer, the term of this patent is extended or adjusted under 35 U.S.C. 154(b) by 53 days.

(21) Appl. No.: 11/411,060

(22) Filed: Apr. 25, 2006

(65) Prior Publication Data

US 2007/0152515 A1    Jul. 5, 2007

(51) Int. Cl.
*H02K 41/02* (2006.01)
*H05K 13/04* (2006.01)

(52) U.S. Cl. ............................. 29/743; 137/38; 137/48; 294/64.1

(58) Field of Classification Search ............... 29/743, 29/623.1; 137/38, 48, 625.65; 227/8, 130; 294/64.1
See application file for complete search history.

(56) References Cited

U.S. PATENT DOCUMENTS

| 2,670,759 | A | * | 3/1954 | St Clair | 137/540 |
| 3,795,964 | A |   | 3/1974 | Beckman | 493/304 |
| 3,829,952 | A |   | 8/1974 | Trask | 29/731 |
| 3,978,775 | A |   | 9/1976 | Buckley et al. | 493/8 |
| 4,100,718 | A |   | 7/1978 | Focke et al. | 53/234 |
| 4,203,206 | A |   | 5/1980 | Morris et al. | 29/731 |
| 4,369,571 | A |   | 1/1983 | Sugalski | 29/731 |
| 4,460,855 | A |   | 7/1984 | Kelly | 318/135 |
| 4,860,795 | A | * | 8/1989 | Oten | 138/46 |
| 5,091,665 | A |   | 2/1992 | Kelly | 310/12 |
| 5,947,708 | A |   | 9/1999 | Park et al. | 417/552 |
| 6,035,518 | A |   | 3/2000 | Slivar | 29/592.1 |
| 6,541,152 | B1 |  | 4/2003 | Shoji et al. | 429/142 |

FOREIGN PATENT DOCUMENTS

EP        0784753        11/2000

OTHER PUBLICATIONS

LinMot Product Catalog, http://www.LinMot.com, Apr. 2003, p. 84.*
Lin-Mot® Product Catalog, http://www.LinMot.com, Apr. 2003, 104 pages.
LinMot® "Motor cooling," http://www.LinMot.com, Jun. 1999, 1 page.
LinMot® "Linear Motors," printed on Dec. 16, 2005, 6 pages.

* cited by examiner

*Primary Examiner*—A. Dexter Tugbang
*Assistant Examiner*—Livius R Cazan
(74) *Attorney, Agent, or Firm*—Fish & Richardson P.C.

(57) ABSTRACT

Apparatus and associated systems or methods include a linear machine with an elongate, axially-slidable core member (i.e., shaft). In one embodiment, the shaft includes at least one radial aperture to provide fluid (e.g., air) communication from an interior volume of a winding tube that contains one or more stationary windings, to either end of the shaft through a lumen that extends axially through the length of the shaft. The stationary windings are spaced apart to permit fluid to flow through a plurality of radial apertures in the winding tube. In particular, fluid circulation across the windings may provide sufficient cooling to increase the machine's maximum current rating. The fluid circulation may also provide pneumatic processing capabilities (e.g., vacuum hold, blow-off). In one exemplary embodiment, the apparatus may be used to insert tube-and-square paper separators into battery casings at high rates.

12 Claims, 15 Drawing Sheets

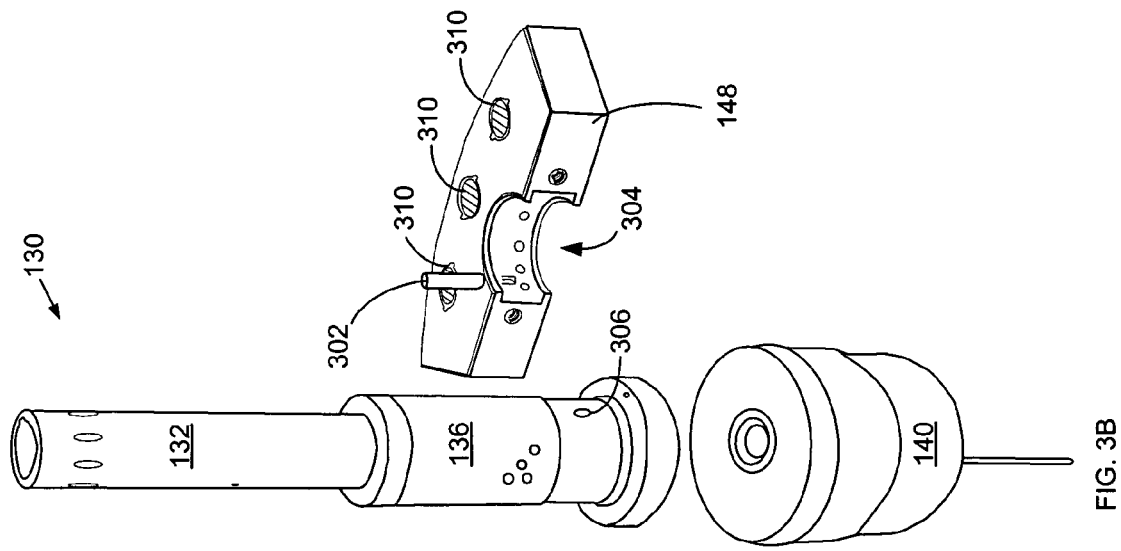
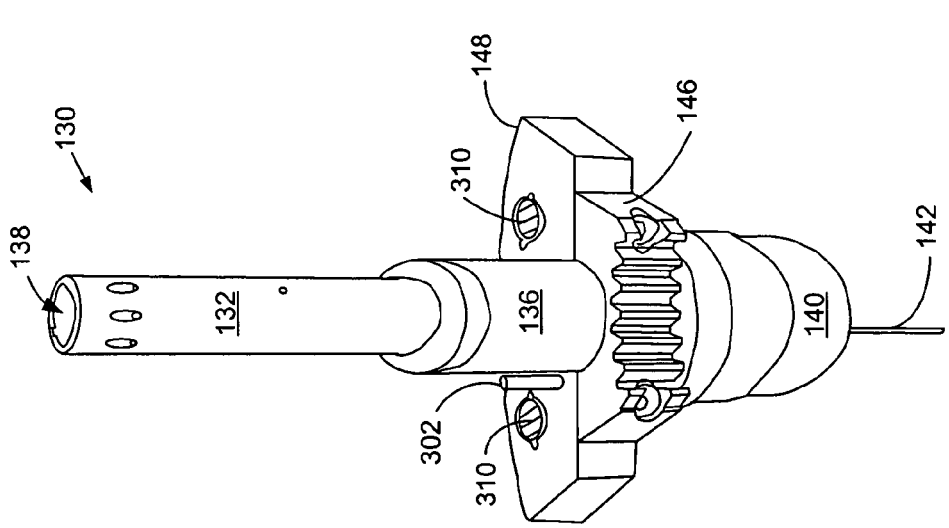
FIG. 3B
FIG. 3A

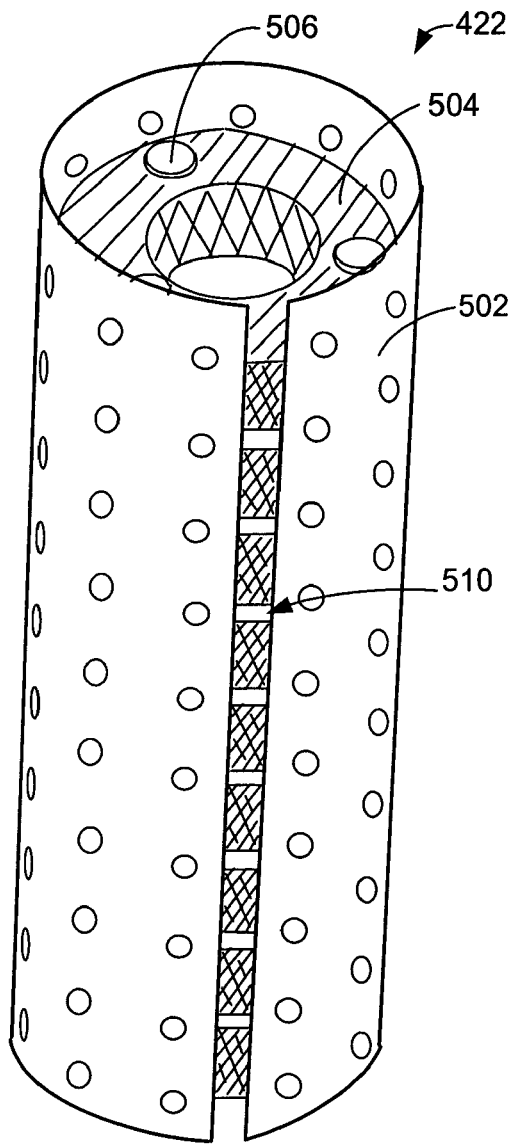
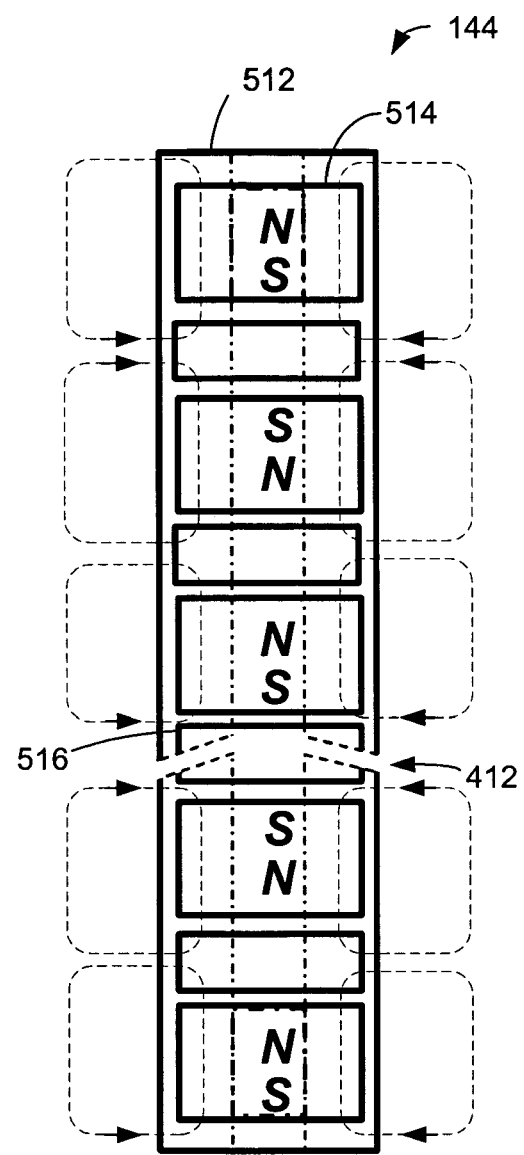
FIG. 5A
FIG. 5B

HIGH SPEED VALVE ASSEMBLY

CROSS-REFERENCE TO RELATED APPLICATIONS

This application claims priority under 35 U.S.C. §120 to U.S. application Ser. No. 11/323,164, "High Speed Assembly Actuator" to Motherway, which was filed on Dec. 30, 2005, now U.S. Pat. No. 7,471,019, the entire contents of which are incorporated herein by reference.

TECHNICAL FIELD

Embodiments relate generally to manufacturing equipment, and particular embodiments relate to actuators for high speed operations.

BACKGROUND

Some products are manufactured on assembly lines that may use conveyor systems to transport articles between two or more processing stations. In some assembly lines, the articles may move in a continuous flow substantially without stopping. In some other assembly lines, the movement of articles may be segmented or indexed by, for example, slowing down or stopping at certain processing stations.

In some assembly lines, motion may be imparted to objects to assemble a product. Motion can be imparted to objects in a variety of manufacturing processes to serve a variety of purposes. Some motion may transport objects from one location to another, such as from one processing station to another. Other motion, such as stirring or stamping, may be imparted to directly process an article.

Various mechanical, pneumatic, and electromechanical devices have been used in manufacturing processes to impart motion that is both desired and useful. Mechanical devices may convert force to a desired motion by employing elements such as cams, gears, pinions, linkages, or pulleys. Pneumatic devices may impart motion using valves, pistons, and hydraulic fluids. Electromechanical devices (i.e., motors) generally impart motion by converting electromagnetic energy to a force.

To impart motion to an object, electric motors can generate torque or thrust. A rotary motor can convert electrical input energy to rotational torque on a shaft. A linear motor can convert electrical input energy to a linear force (i.e., thrust). In general, torque or thrust is a function of motor current.

In some cases, a maximum current rating may be defined for a motor under certain operating conditions. The maximum current rating may determine a maximum motor torque or thrust that may be generated by the motor under those operating conditions. The maximum current rating may be, for example, based in part on thermal characteristics of the motor. For example, a maximum safe temperature in the motor may be used to determine maximum current ratings, such as the maximum average or r.m.s. (root-mean-square) current that may be continuously applied to the motor windings without overheating the motor, and the maximum current ratings may be used to determine a maximum rated torque or thrust.

SUMMARY

Apparatus and associated systems or methods include a linear machine with an elongate, axially-slidable core member (i.e., shaft). In one embodiment, the shaft includes at least one radial aperture to provide fluid (e.g., air) communication from an interior volume of a winding tube that contains one or more stationary windings, to either end of the shaft through a lumen that extends axially through the length of the shaft. The stationary windings are spaced apart to permit fluid to flow through a plurality of radial apertures in the winding tube. In particular, fluid that is directed to flow between the windings may sufficiently cool the windings and other components to increase the machine's maximum current rating. The fluid flow may also provide pneumatic processing capabilities (e.g., vacuum hold, blow-off). In one exemplary embodiment, the apparatus may be used to insert tube-and-square paper separators into battery casings at a rate of up to 500 insertions per minute, for example.

Systems, and associated apparatus, methods, or computer program products, may provide the capability to perform one or more sets of assembly operations at a high throughput rate, such as up to at least 500 sets of operation per minute. In particular, each assembly operation may involve performing a complex combination of sub-operations on an object that is being assembled. In an embodiment, the system may include a linear motor with a lumen extending axially through the core, an end-effector coupled to the core to perform operations, and a fluid flow system for circulating fluid through the core. Some embodiments may include a sub-system for dispensing materials to the end effector.

Such a system may perform a variety of sub-operations, such as accelerating a mandrel axially to operate on a work piece, tracking a work piece and positioning the mandrel to operate on the work piece, applying a vacuum pressure to apertures in the mandrel to hold at least one object to be manipulated, and quickly reversing the vacuum to a positive pressure to release the at least one object at a predetermined point in the motion profile. The system may further perform other sub-operations, for example, to dispense, form, and/or cut materials in cooperation with other operations.

In one illustrative example, battery cells may be manufactured using a system to rapidly insert two paper-like separators into battery cell casings on a continuous flow manufacturing line. Embodiments of the systems may be incorporated into other applications, such as robotic or pick-and-place-like equipment.

Some embodiments may provide one or more advantages. For example, the system may be readily adapted and installed on new or existing manufacturing lines to perform one or more processes. As such, manufacturing assets may be flexibly configured, saving cost and reducing down-time. Embodiments of the motor may provide operations that can sustain high production throughput (e.g., over about 400 parts per minute, up to at least about 500 parts per minute) on indexed or continuous flow processes. Embodiments may lower system cost, require relatively simple maintenance, and incur low installation costs. Embodiments may be added installed with little or no manufacturing down-time. Certain complex operations can be performed at high throughput rates. The end effector may be easily replaced and can be configured to perform a variety of applications.

The details of one or more embodiments of the invention are set forth in the accompanying drawings and the description below. Other features, objects, and advantages of the invention will be apparent from the description and drawings, and from the claims.

DESCRIPTION OF DRAWINGS

FIGS. 3A, 3B are exploded and assembly views of an exemplary linear actuator sub-assembly of FIG. 1.

FIG. 5A is a perspective view of a winding tube of the linear actuator of FIGS. 4A-4C.

FIG. 5B is a schematic representation of a portion of a shaft that includes magnetic field generators in the linear actuator of FIGS. 4A-4C.

In the various drawings, like reference symbols indicate like elements.

DETAILED DESCRIPTION OF ILLUSTRATIVE EMBODIMENTS

Figure 1:
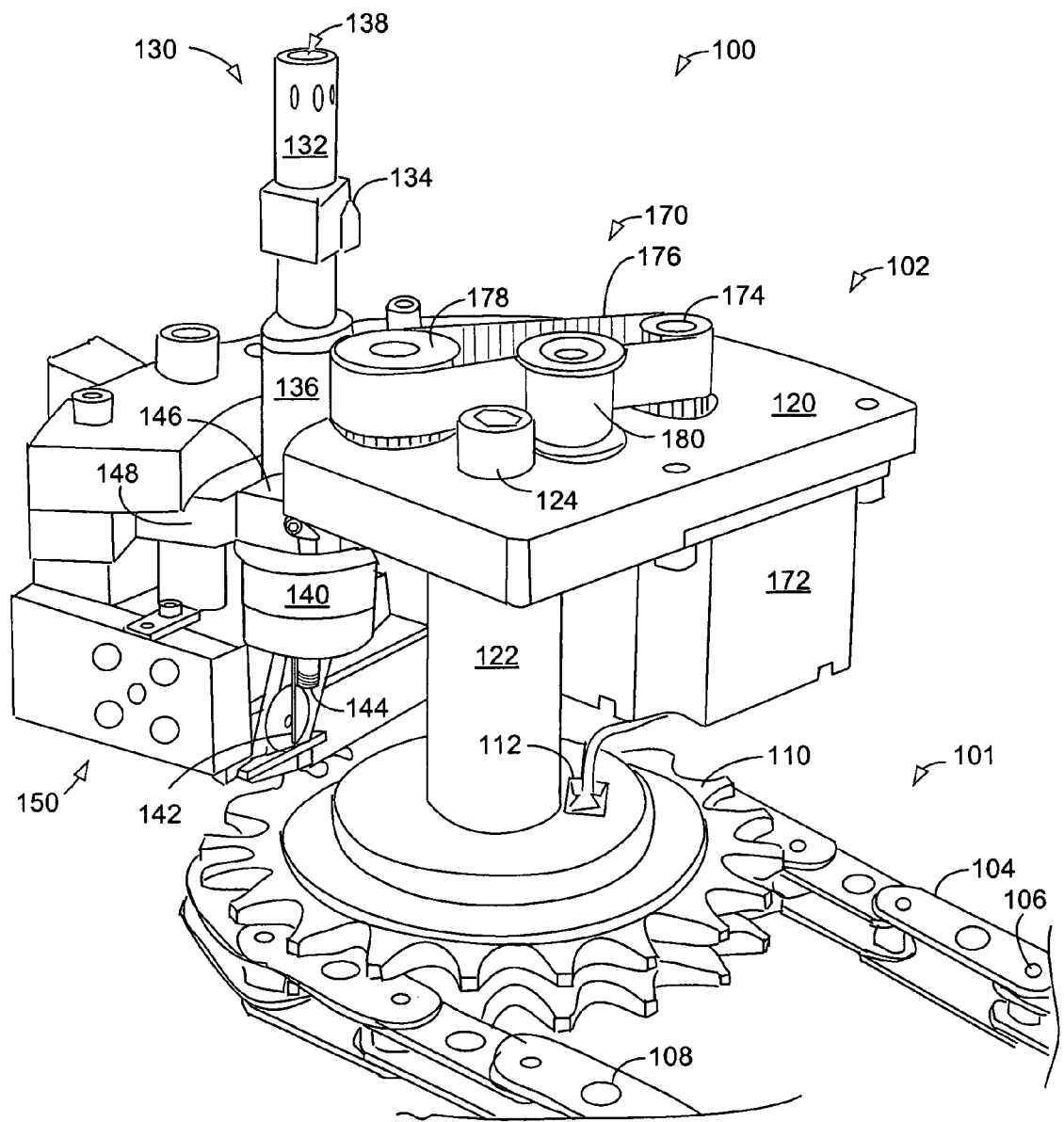
FIG. 1 is a perspective view of an exemplary high speed assembly system installed at a sprocket on an exemplary assembly line which may be used to manufacture batteries.

This document describes systems and methods that involve linear actuators capable of sustained high speed operation. Various embodiments of a linear actuator (hereinafter "linear motor") provide for radial fluid flow around and/or between windings. When energized, the windings can generate thrust on an axially slidable shaft. The shaft includes a lumen extending longitudinally through the length of the shaft and appropriately configured apertures. A heat transfer fluid, such as air, may flow radially between the windings and through the apertures in the shaft, and then axially through the lumen. This fluid flow may remove substantial heat from the interior of the motor. This cooling may enable higher current to be applied, which in turn may allow higher force and acceleration necessary to perform operations at a high throughput rate, such as about 500 operations per minute.

When combined with a pressurized fluid flow source, using structures and techniques as exemplified in embodiments described herein, the cooling can be enhanced. In addition, high speed pneumatic operations, such as object manipulation, can be integrated with the high speed linear motion. Thus, various embodiments may combine high speed pneumatic operations and high speed linear actuation.

In embodiments, a linear motor and associated subsystems may provide the capability to perform one or more sets of assembly operations at a high throughput rate, such as up to at least 500 sets of operation per minute. In particular, such a motor may be used for assembly operations that involve performing complex combinations of sub-operations. Combinations of sub-operations may include, for example, three-dimensional motion profiles, and pneumatic operations that respond to the pressure of the fluid in the lumen of the core. In some applications, the pneumatic feature may be used to manipulate more than one object, such as picking up and releasing multiple objects.

To aid understanding of the various embodiments, aspects, features, and implementations, much of the description is directed to an exemplary complex manufacturing operation, namely inserting tube-and-square paper separators into battery casings in a continuous flow assembly line. As will be described, one cycle of inserting separators into a battery casing may involve a sequence of about 11 distinct sub-operations.

By way of introducing the exemplary application, paper-like separators are typically inserted into battery casings to separate the anode (formed along the interior wall of the casing) from the cathode (a slurry that is poured into the "bowl" formed by the separators). One type of separator system is known as tube-and-square. Before inserting the separators into the battery casing using this method, a rectangular separator is rolled into a substantially cylindrical shape to form the vertical side walls of the separator bowl, and a square separator is placed to cover the bottom opening of the cylinder. The square separator end of the tube-and-square is inserted into a battery casing, such as a casing for an "AA" battery cell. The bottom square separator overlaps the bottom end of the tube separator, thereby forming a gap-free barrier between the cathode and the anode. Another type of separator system is known as cross-placed. Cross-placed separators typically use two orthogonally-placed rectangles of similar size that both fold up to form the side walls of the bowl.

These two methods may have different manufacturing and electrical characteristics. The tube-and-square separator systems typically require less separator material. A reduced volume of separator material may reduce internal resistance and may permit additional active materials to be put into the battery, which may contribute to longer battery life. However, reliably handling and processing small square paper-like separators in a high-speed manufacturing environment presents some challenging difficulties that may be overcome by embodiments described herein.

Although described in the context of the exemplary application of inserting tube-and-square paper separators into battery casings in a continuous flow assembly line, this example is intended to aid understanding and is not intended to be limiting. Other embodiments may be configured to perform different operations, such as, for example, pick-and-place type operations. Other embodiments may be adapted to perform operations on articles other than paper separators for battery casings. For example, a different end effector may be applied, for example, to manipulate payloads other than paper-like separators. Such alternate payloads may include RFID (radio frequency identification) tags, electronic components (e.g., integrated circuits, active or passive devices in surface mount packages), small objects (e.g., ball bearings), for example. Moreover, embodiments may be deployed in other manufacturing applications that may use conveyor systems other than those illustrated in the exemplary embodiments depicted herein. For example, embodiments may use other motion systems to direct or guide the movement of an article to be processed. Such motion systems may incorporate forced air, belts, gravity, manual placement, robotic manipulators, tracks, guides, and the like, to convey objects to be processed by embodiments of a high speed assembly system.

To facilitate understanding of the various embodiments, the description below will introduce various aspects of the exemplary application of a system for inserting tube-and-square paper separators into battery casings in a continuous flow assembly line. After introducing some major subsystems and a control system for the exemplary system, design and construction of an exemplary linear actuator subsystem that provides a high-speed insertion motion will be described. Next, details of an exemplary inertial valve that facilitates aspects of the high speed insertion operation are presented. Following that are discussions of a subsystems for (1) feeding, wrapping, and cutting the paper separators, and (2) for accurately positioning the linear actuator. Flexible installation on an assembly line is described next, followed by a discussion of the methods for operating the high speed assembly system, including illustrations of a sequence of events in one exemplary cycle of operation. Then, additional features that may provide enhanced functionality for the high speed assembly system will be discussed.

High Speed Assembly System

FIG. 1 shows an exemplary high speed assembly system 100 that is configured to insert square and cylindrical (i.e., tube) shaped paper separators into open-top battery casings (not shown). The system 100 includes a conveyor assembly 101 that positions battery casings under an insertion assembly 102. In this example, as the conveyor assembly 101 advances the battery casings, the insertion assembly 102 may perform operations to insert a square-shaped paper separator and a cylindrical-shaped paper separator into each battery casing.

The conveyor assembly 101 of this example includes a chain of links 104 connected together by link pins 106 at opposite ends of each link 104. The center of each link 104 includes a holder 108 adapted to receive an object, such as a battery casing. The links 104 make a turn around a sprocket 110. The sprocket 110, which may be, for example, independently driven, synchronized, or passively rotatable, has teeth to engage the link pins 106. The system 100 may receive information about the position of a battery casing in a holder 108 from a conveyor position sensor 112, which may be an encoder, resolver, hall effect sensor, or other position detection device, that monitors the position of the sprocket 110. In one embodiment, the rate at which the conveyor assembly 101 advances the battery casings for separator paper insertion may be variable. In that case, the conveyor position sensor 112 may provide timing and/or battery casing position information to a controller (not shown) for the insertion assembly 102, which may have its cycle time adjusted to correspond to the advance rate of the battery casings. Although the conveyor assembly 101 in this example has a chain turning around the sprocket 110, other implementations may use other types of conveyor systems. Some implementations may convey the casings in a straight line, or provide a turn angle different from that shown in FIG. 1. In various embodiments, the insertion assembly 102 may be used with other types of conveyor systems, as described elsewhere herein.

The insertion assembly 102 includes a base plate 120 that supports the following component sub-assemblies: a linear actuator sub-assembly 130; a feed-cut (FC) sub-assembly 150; and, an actuator positioning sub-assembly 170. In this example, the base plate 120 is supported on a sprocket column 122. The base plate 120 is releasably attached to the sprocket column 122 by a base mount fastener 124. The base mount fastener 124 may be a shoulder bolt, for example, that facilitates rapid installation or removal of the insertion assembly 102 from the sprocket column 122. In various embodiments, the insertion assembly 102 may be mounted adjacent to or above the conveyor assembly 101, and not necessarily on a sprocket.

The linear actuator sub-assembly 130 inserts separator paper into battery casings as they are advanced by the conveyor assembly 101. During one operating cycle of the paper insertion process, the linear actuator sub-assembly 130 performs multiple operations, including: 1) receiving one vertically-oriented separator paper and one horizontally-oriented separator paper; 2) forming the substantially vertically-oriented separator paper into a cylindrical shape around a cylindrical mandrel; 3) vacuum holding the separator papers to the mandrel; 4) transporting the separator papers to a position above a battery casing; 5) inserting the separator papers into the battery casing; and, 6) releasing the separator papers from the mandrel. In some examples, these operations may be repeated up to at least about 500 cycles per minute.

The linear actuator sub-assembly 130 includes a chimney 132, a shaft position sensor 134, a pressure tube 136, an exhaust port 138, a pin wrap motor 140, a wrap pin 142, a shaft 144 (shown with mandrel disassembled), a gear sector 146, and an air bearing 148. The linear actuator assembly includes a linear motor to accelerate the shaft 144 in the vertical (i.e., z-axis direction). The shaft position sensor 134 may provide position feedback information for controlling the motor and/or the motion of the shaft 144. When a mandrel is coupled to the shaft 144, the linear motor may accelerate the mandrel up and down to insert objects attached to the mandrel into an open-top battery casing. In one embodiment, objects may be attached and released by operations and structures of the linear actuator assembly 130 that are designed to handle a pressurized fluid.

In brief overview, one embodiment of the linear actuator assembly 130 handles pressurized fluid as follows. A pressurized fluid, such as pressurized air, is injected into a pressure cavity formed by the gear sector 146 and the air bearing 148 around the pressure tube 136. The pressurized fluid flows through apertures (not shown in FIG. 1) in the pressure tube 136 and the shaft 144, and is exhausted through the exhaust port 138 via the chimney 132. The shaft 144 has a hollow central portion, with a lumen extending axially from its top end to its bottom end. The apertures in the shaft 144 may impart axial, tangential, and/or radial components to the fluid to induce a rotation as it flows through the shaft. When the fluid flow through the top end of the shaft 144 to the chimney 132 is unobstructed, a negative (vacuum) pressure may form at the bottom end of the shaft 144. This vacuum pressure may be used, for example, to manipulate (e.g., pick up or hold) separator paper to the mandrel. If the fluid flow through the top end of the shaft 144 to the chimney 132 is rapidly blocked, the negative pressure at the bottom end of the shaft 144 may quickly change to a positive pressure. This quick pressure reversal may be used, for example, to quickly release (i.e., blow off) the separator paper from the mandrel.

Other features of the linear actuator assembly 130 contribute to other functions such as paper handling. For example, after an appropriate length of the vertically-oriented separator paper has been dispensed into the gap between the wrap pin 142 and the mandrel (not shown) attached to the shaft 144, the pin wrap motor 140 can move the wrap pin 142 around the mandrel to cause the vertical separator paper to "wrap" around the mandrel, thereby forming a cylindrical-shaped tube suitable for insertion into a battery casing. These operations are performed in cooperation with the FC sub-assembly 150.

Embodiments of the linear actuator sub-assembly 130 are described in further detail with reference to FIGS. 3-6. The operation of the linear actuator sub-assembly 130 may be achieved with electrical, mechanical and pneumatic inputs (not shown), and in cooperation with the feed-cut (FC) sub-assembly 150 and the actuator positioning sub-assembly 170.

The FC sub-assembly 150 may feed two ribbons of separator paper from roll stock, the ribbons being in a substantially orthogonal orientation with respect to each other. For example, one ribbon may be dispensed in a substantially vertical orientation, and the other ribbon may be dispensed in a substantially horizontal orientation. The FC sub-assembly 150 includes a mechanism for dispensing an appropriate length of each ribbon, and a knife mechanism for cutting the ends of the ribbons. The cut pieces may be manipulated by the linear actuator sub-assembly 130 for insertion into a battery casing. Embodiments of the FC sub-assembly 150 are described in further detail with reference to FIGS. 7A-7B.

The actuator positioning sub-assembly 170 operates to position the linear actuator sub-assembly 130. In one part of the cycle, the actuator positioning sub-assembly 170 positions the linear actuator sub-assembly 130 near the FC sub-assembly 150 to receive separator paper to be inserted in a battery casing. In another part of the cycle, the actuator positioning sub-assembly 170 positions the linear actuator sub-assembly 130 above a battery casing so that the linear actuator sub-assembly can perform the insertion, release, and extraction operations. In the system 100 of this example, the linear actuator sub-assembly 170 provides the capability to dynamically align the linear actuator sub-assembly 130 with substantially constant motion-type conveyor systems, index advance systems, or other conveyor systems. This may promote high throughput and the flexibility to operate with various conveyor systems.

The actuator positioning sub-assembly 170 includes an assembly positioning motor 172, a motor drive shaft 174, a belt 176, a spindle 178, and a belt tensioner 180. These components provide the drive and transmission for positioning the linear actuator sub-assembly 130. The transmission may engage the gear sector 146 on the linear actuator sub-assembly 130 using, for example, a spur gear (not shown) coupled to the spindle 178. The assembly positioning motor 172 may be a motor, such as a stepper motor, for example, capable of positioning and/or velocity control. In some embodiments, the actuator positioning sub-assembly 170 may include one or more gears. Embodiments of the actuator positioning sub-assembly 170 are described in further detail with reference to FIG. 8.

Figure 2:
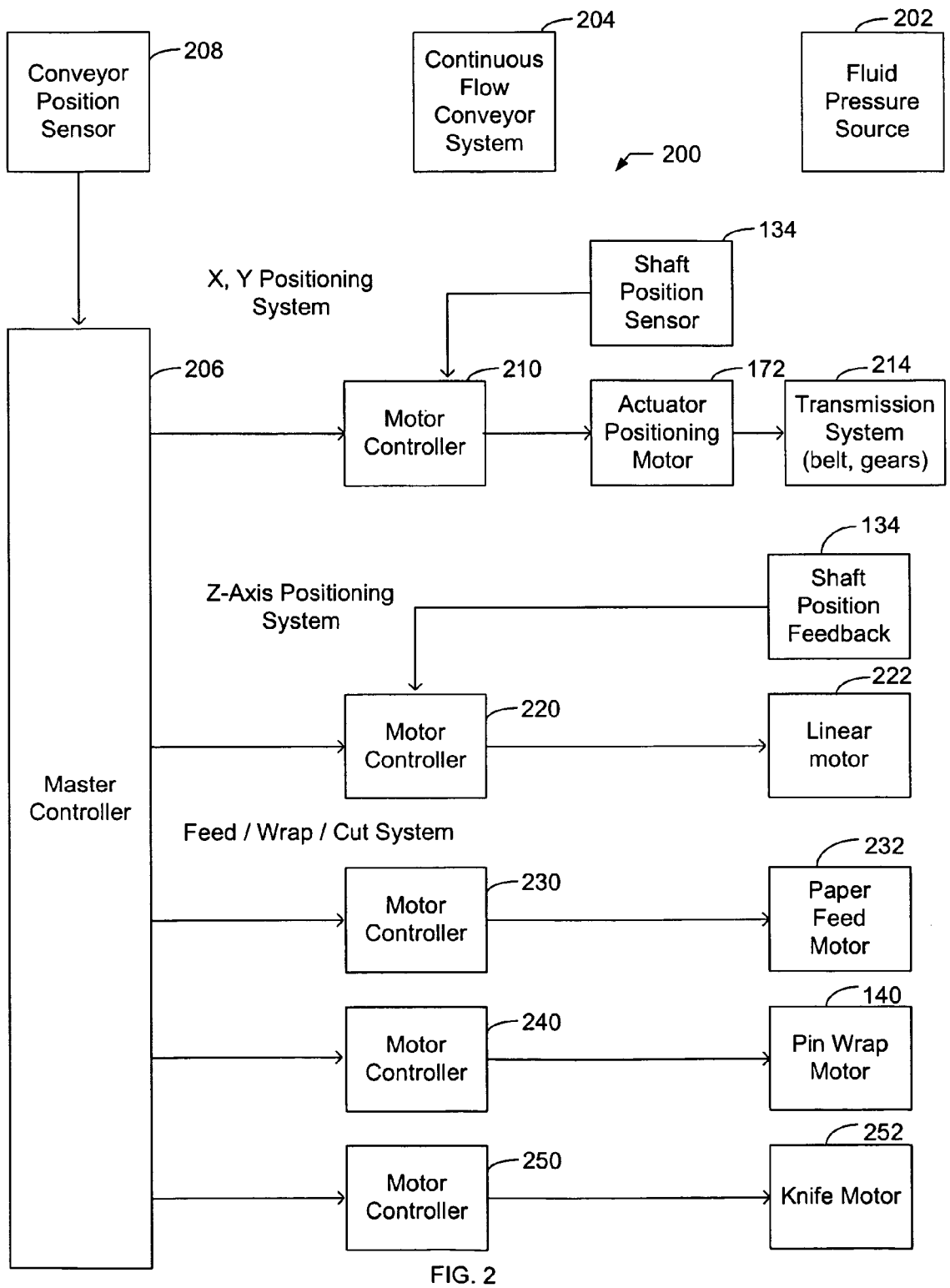
FIG. 2 is a block diagram of an exemplary control system for the high speed assembly system of FIG. 1.

FIG. 2 shows an exemplary control system 200, including power systems and control logic, for operating the various sub-components of the high speed assembly system 100. The control system 200 cooperates with a fluid pressure source 202, which may provide, for example, a source of pressurized air and/or other gaseous fluid. The control system 200 also cooperates with a continuous flow conveyor system 204, such as the conveyor assembly 101, which may be used to advance battery casings.

In this example, the control system 200 includes a master controller 206, which may be a Programmable Logic Controller (PLC) or other processor-based system to orchestrate, supervise, and/or monitor operations over a single cycle and/or an entire production run. The master controller 206 is coupled to receive information about the conveyor position from one or more conveyor position sensors 208, an example of which is sensor 112. This information may indicate to the master controller 206 the position of the next battery casing, for example. When the next battery casing reaches a predetermined position on the conveyor 204, for example, the master controller 206 may initiate operations to insert separator paper into that battery casing.

In this example, the master controller 206 may initiate operations by communicating with a distributed network of motor controllers 210, 220, 230, 240, 250, each of which may control and monitor specific functions in cooperation with and/or under the control and/or supervision of the master controller 206. In response to commands and/or status information from the master controller 206, the individual motor controllers may execute instructions to control the actions of the sub-assemblies 130, 150, 170. The master controller may communicate with each of the controllers 210, 220, 230, 240, 250 using point-to-point (e.g., backplane, daisy-chain), RS-232, CAN bus, optical (e.g., fiber optic and/or infrared), token-ring, Ethernet, wireless, or other suitable combination of these or other communication interfaces, methods, and/or protocols.

The motor controller 210 is responsible for controlling the actuator positioning motor 172, which controls the position and/or velocity of the linear actuator sub-assembly 130 in the horizontal (i.e., x-y) plane via a transmission system 214. In the embodiment of FIG. 1, the transmission system 214 would include the motor drive shaft 174, the belt 176, the spindle 178, and the belt tensioner 180. In another embodiment, the assembly positioning motor may directly drive a spur gear that engages the gear sector 146, for example. Position information may be received from an assembly position feedback sensor 216, which may be coupled to the spindle 178, for example. In one implementation, and during at least the portion of the cycle when the controller 210 is trying to position the linear actuator sub-assembly 130 in alignment with the battery casing, the controller 210 may compare the position of the battery casing (based on information received from the conveyor position sensor 208 via the master controller 206) and the position of the linear actuator assembly 130 (based on information received from the sensor 134) to determine an error signal.

The motor controller 220 is responsible for controlling the z-axis position of the linear motor shaft 144 on the linear actuator sub-assembly 130. The linear actuator motor 222 may extend and retract in a substantially vertical (i.e., z-axis) motion to rapidly insert separator papers into a battery casing. For example, a shaft position sensor 134 provides shaft position information to the linear actuator motor controller 220. The controller 210 may use the shaft position information to determine how the phase windings should be driven (i.e., energized), and may also be used in a thrust, velocity, position and/or other control loop for controlling the shaft 144.

The motor controller 230 is responsible for controlling a paper feed motor 232, which dispenses suitable lengths of separator paper. In one embodiment, the motor 232 is coupled through gears and/or by direct drive to one or more rubber-coated wheels that engage the surface of each paper in the FC sub-assembly 150. In one embodiment, gears are used to feed a substantially fixed ratio of vertical and horizontal separator paper, respectively. In another embodiment, the motor controller 230 separately drives two paper feed motors to feed appropriate lengths of the vertical and horizontal separator paper.

The motor controller 240 is responsible for controlling the pin wrap motor 140, which wraps the vertically oriented paper around the mandrel on the shaft to form a cylindrical tube. While the paper is being dispensed by the paper feed motor, or slightly thereafter, the controller 240 may start rotating the pin 142 through an angle of rotation from about 180 degrees up to about 360 degrees, such as, for example between about 270 degrees and about 345 degrees, or enough so that the pin 142 rotates close to or a little beyond the end of the vertically oriented paper. In some embodiments, it may not be necessary to rotate completely to the end of the paper while the mandrel is exerting a vacuum force on the paper. In some embodiments, and while the paper is being cut, or slightly thereafter, the controller 240 may reverse the rotation of the pin wrap motor 140, so that the wrap pin 142 forms the newly cut end of the tube separator paper around the mandrel. The reverse rotation may rotate the pin 142 through any practical angle of rotation, including more than 360 degrees, such as, for example, between 1.1 revolutions and up to at least 4 or more revolutions to accomplish multiple wrap layers of the tubing. Multiple wrap layers may be accomplished in other embodiments, with or without the pin 142, in which the mandrel itself rotates to accomplish forming the tube.

The motor controller 250 is responsible for controlling a knife motor 252, which drives at least one knife to cut the ends of the separator paper that have been dispensed by the paper feed motor 232. In one embodiment, two knives are attached to a linear transmission, which may be a linear drive gear or a belt, for example. One of the two knives may be a circular knife for cutting the horizontally oriented paper, and one may be a vertical blade for cutting the vertically oriented paper. In other implementations, one knife may cut both papers, for example. The knife motor 252 may be activated to begin cutting after the paper has been dispensed, and/or after the pin 142 has secured enough of the paper to the mandrel.

In correcting position or velocity errors, for example, any of the controllers 210, 220, 230, 240,250 may apply a controlled correction response to minimize the time required to achieve zero position error (within acceptable tolerance window in which the insertion operation may be performed). The control response may be characterized, for example, as over-damped, under-damped, or critically-damped, depending on the optimal solution. Each controller may take into account, for example, the estimated velocity profile of the battery casing as a function of time, as well as the available power from the corresponding motor, in generating the optimal control response. The controller may apply digital and/or analog control techniques, depending on whether the information is sampled, delayed, or in continuous time domain.

The shaft position sensor 134 may be implemented, for example, by providing a linear encoding scale along the axial dimension of the shaft 144. An optical encoder mounted external to the chimney 132 may detect shaft movements by monitoring reflected light through an aperture in the wall of the chimney 132. In another example, one or more coils and/or analog hall sensors disposed at positions along the length of travel of the magnetic generators (i.e., permanent magnets) in the shaft 144. Such coils may be monitored for induced voltage that indicates motion of the shaft. These and/or other techniques, such as limit switches or terminal voltage sensing, may be used alone or in combination to sense the position and/or velocity of the shaft 144.

In various implementations, any of the motors 172, 232, 140, and 252 may be selected from any suitable motor type, such as DC, AC, permanent magnet, brushless DC (BLDC), stepper, synchronous, or induction. Each motor may drive its corresponding load through direct drive coupling, or indirectly, through gears, belts, cams, and/or other transmission mechanisms. Some embodiments may operate one or more of the motors 172, 232, 140, and 252 without sensor feedback, either using open loop, parametric sensing, or other (e.g., feed forward) techniques, and some may incorporate one or more feedback sensors, including limit switches, Hall effect sensors, resolvers, encoders, tachometers, optical sensors (e.g., bar code, beam interruption), or other suitable sensor devices.

The master controller 206 may also implement control functions that relate to use of a pressurized fluid medium. Flow control and pressure regulation of the medium in the hollow core of the linear actuator sub-assembly 130 may be necessary to provide for a correct and/or more efficient handling of the separator paper and the insertion process. Additionally, feedback sensors may monitor temperature of the fluid medium exhaust at the chimney 132, for example, in order to determine if proper cooling of the linear actuator sub-assembly 130 is occurring. Flow rates, throughput rates, and/or pressure of the fluid medium may then be adjusted accordingly.

FIGS. 3A-3B illustrate, in an exemplary embodiment, construction details of the linear actuator sub-assembly 130. FIG. 3A shows the chimney 132, the pressure chamber 136, the exhaust port 138, the pin wrap motor 140, the pin 142, the gear sector 146, and the magnetic air bearing 148 of FIG. 1, and introduces a pressure input port 302. FIG. 3B further introduces a pressure cavity 304, a pressure tube input port 306, and magnets 310. Accordingly, FIGS. 3A-3B are used to explain how the linear actuator sub-assembly 130 contributes to at least three functions: 1) handling pressurized fluids; 2) forming separator paper; and, 3) positioning the linear actuator sub-assembly 130.

With respect to the pressurized fluid medium handling function, the air bearing 148 includes the pressure input port 302, which can introduce pressurized fluid from a pressure source, such as the fluid pressure source 202. The pressurized fluid may flow from the pressure input port 302, into the pressure tube 136, and exit via the chimney 132 through the exhaust port 138. In this example, this stream of pressurized fluid is handled by the linear actuator assembly 130 in such a way as to both cool the linear motor and to manipulate separator paper to generate very high throughput assembly operations.

With respect to the paper forming function, the linear actuator sub-assembly 130 includes the pin wrap motor 140 and the wrap pin 142. The pin wrap motor 140, when actuated, may provide a circumferential motion of the wrap pin 142. The circumferential motion may wrap one of the separator papers around a cylindrically shaped mandrel (see FIG. 4A, item #414). In this cylindrical (i.e., tube) shape, the separator paper may be inserted into a battery casing to form the side walls of the separator barrier between the anode and the cathode. In one embodiment, the separator paper may be wrapped around the mandrel by the pin wrap motor 140 and held in place by a low pressure (i.e., vacuum) induced in the core of the mandrel by the action of the pressurized fluid medium.

With respect to the linear actuator positioning function, the gear sector 146 and the air bearing 148 are coupled around the linear actuator sub-assembly 130 to form an exemplary mechanism for both positioning and supporting the linear actuator sub-assembly 130. Positioning may be achieved by the gear sector 146 engaging the actuator positioning sub-assembly 170. For example, the gear sector 146 may engage with a corresponding gear in the transmission system 214. Supporting may be achieved by magnetic attraction of the magnetic air bearing 148 to a bottom surface of the base plate 120. The base plate 120 may include magnets, and the magnetic air bearing 148 may include a high magnetic permeability material, such as steel, or vice versa.

FIG. 3B illustrates in an exploded view an exemplary linear actuator assembly 130 for handling a pressurized fluid to perform the paper insertion process, and to support the linear actuator assembly 130 to the base plate 120 with very low friction with respect to motion in the x-y plane.

FIG. 3B illustrates how the magnetic air bearing 148 and the gear sector 146 may be sealably coupled to form the pressure cavity 304 around a portion of the pressure tube 136. When sealably coupled to the pressure tube, an annular volume within the pressure cavity 304 may receive pressurized fluid introduced through the pressure input port 302. This pressurized fluid may exit the pressure cavity 304 through the pressure tube input port 306, and/or through leakage paths provided in the magnetic air bearing 148. The fluid path through the pressure tube input port 306 will be described in detail with reference to FIGS. 4A-4C.

The leakage paths from the pressure cavity 304 through the magnetic air bearing 148 may, in one embodiment, provide a thin layer of fluid between mating surfaces of the magnetic air bearing 148 and the base plate 120. By reducing or substantially eliminating large surface area contact, sliding friction between the magnetic air bearing 148 and the base plate 120 may be reduced. This allows the actuator positioning sub-assembly 170 to achieve higher acceleration and velocity of the linear actuator sub assembly 130 in the x-y plane, and it may reduce the maintenance and/or material costs associated with the surface materials. The reduced friction feature may also allow the system 100 to achieve higher throughput rates.

In some embodiments, the magnetic air bearing 148 may include one or more magnets 310 on a top surface that faces the bottom surface of the base plate 120. Some embodiments may also have one or more magnets in the circumferential surface (not shown) to provide attraction force to a corresponding curved vertical wall of the base plate 120. Leakage paths from the cavity 304 may extend to one or more of the wells in which magnets 310 are installed. A small leakage path may be provided near or around at least some of the magnets 310, according to one embodiment. In some embodiments, the leakage paths may be distributed at a number of locations along the top and/or circumferential side of the magnetic air bearing 148.

In one illustrative example, the air bearing 148 may have a curved outer surface. The permanent magnets 310 may be integrally mounted in the air bearing 148 and recessed below Teflon-coated exterior surfaces of the air bearing 148. The magnets 310 may be oriented to provide magnetic attraction forces that may be substantially perpendicular to the curved surface of the air bearing 148, and/or substantially perpendicular to the top surface of the air bearing 148.

In one embodiment, the linear actuator assembly 130 may be magnetically supported by the permanent magnets 310 to the base plate 120. In this example, the linear actuator sub-assembly 130 is mounted such that the curved and top surfaces of the air bearing 148 mate with corresponding surfaces on the base plate 120. The magnets 310 provide magnetic coupling of the air bearing 148 to the base plate 120, thereby supporting the linear actuator sub-assembly 130 in the x-y plane as well as the z-axis. The pressure cavity 304 of the air bearing 148 may contains a number of apertures penetrating through the diametrical surface of the pressure cavity 304 to the cylindrical and top surfaces of the air bearing 148. If a pressurized fluid medium, such as air, is applied to the pressure input port 302, the pressurized fluid will flow into the pressure cavity 304 and through the apertures in the pressure cavity 304 to the exterior surfaces of the air bearing 148. The pressure of the fluid medium provides a repulsion force between the air bearing 148 and the base plate 120 that counteracts the magnetic force of attraction from the magnets 310. The opposing forces may be balanced such that the linear actuator sub-assembly 130 is supported but separated by a layer of escaping pressurized fluid. The result is a low-friction interface between the air bearing 148 and the base plate 120.

In one embodiment, portions of the air bearing 148 and/or the base plate 120 may be coated with a layer of a low-friction material, such as Teflon, to further aid in creating a low friction interface.

In another embodiment, the magnetic field may be generated in the base plate 120 to attract a high permeability material in the magnetic air bearing 148. In such an embodiment, the magnetic field may be generated by permanent magnets and/or winding currents, which may be controlled to produce a minimum sliding friction, for example.

The path for the pressurized fluid that passes through the pressure tube input port 306 will next be described in detail with reference to FIGS. 4A-4C. These views illustrate that pressurized fluid may flow through the linear actuator sub-assembly 130 via a central lumen that extends from the exhaust port 138 through the bottom end of the shaft 144. As such, the linear motor 222 and the pin wrap motor 140 may be referred to as "hollow-core" motors.

Figure 4A:
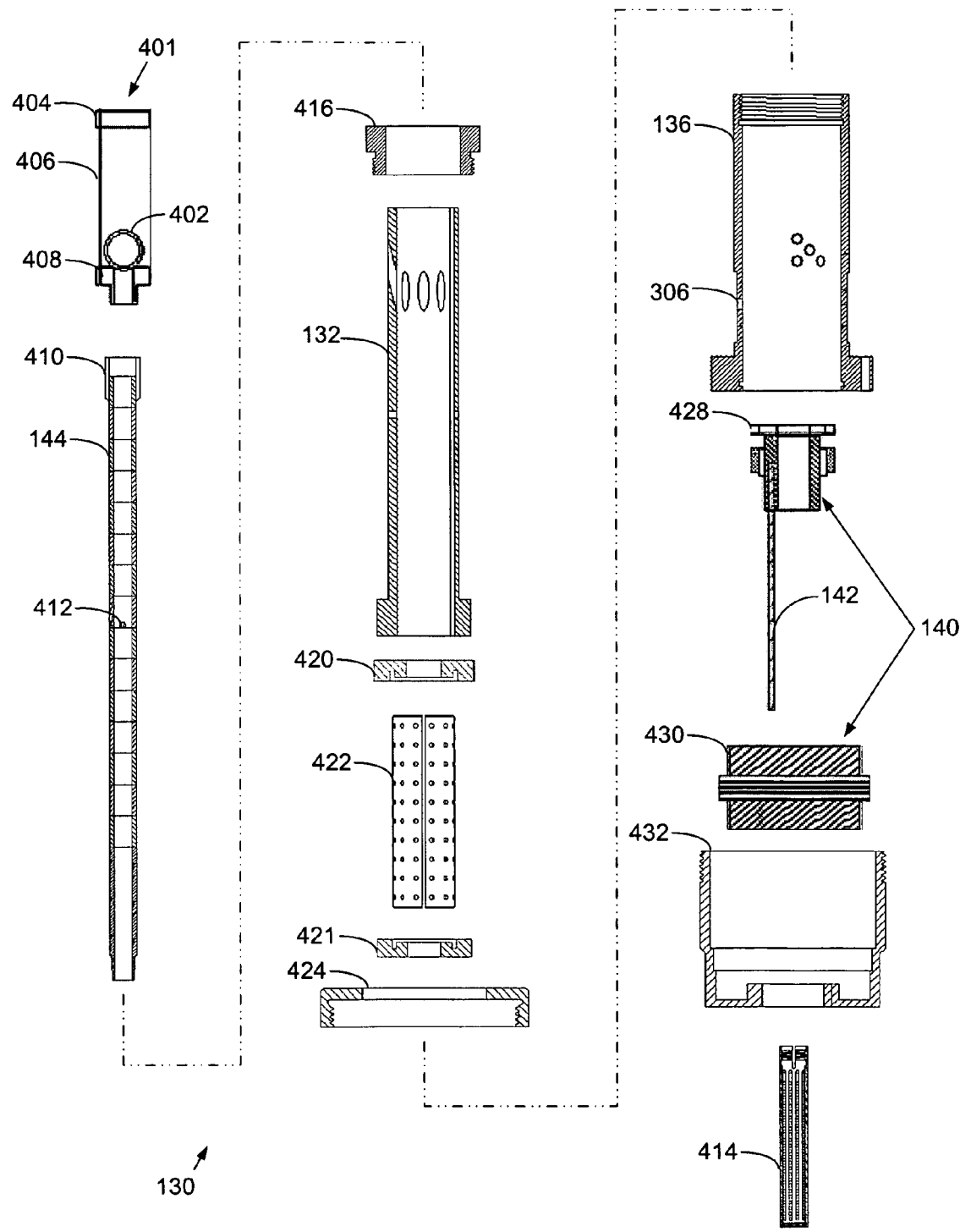
FIGS. 4A, 4B, 4C are cross-sectional views of the exemplary linear actuator sub-assembly of FIGS. 3A and 3B.

The exemplary linear actuator sub-assembly 130 (without gear sector 146 and magnetic air bearing 148) is shown in more detail in the exploded cross-sectional assembly view in FIG. 4A. The linear actuator sub-assembly 130 includes the shaft 144, the chimney 132, the pressure tube 136, and the pin wrap motor 140. FIG. 4A introduces an inertial valve assembly 401, a mandrel 414, a winding tube 422, and their associated components.

The inertial valve assembly 401 includes a bullet 402, a bullet stop 404, a retainer cage 406, and a bullet seat 408. The retainer cage 406 allows the bullet 402 to travel between the bullet stop 404 and the bullet seat 408. The inertial valve assembly 401 is described in further detail with reference to FIG. 6.

The inertial valve assembly 401 is coupled to the shaft 144 by a coupling 410, which may be, for example, a press fit or threaded coupling. In this embodiment, the shaft 144 contains a number of toroidal permanent magnet field generators (e.g., permanent magnets) that have a hollow central core. As such, the shaft 144 (including the magnets) has a substantially hollow central core, and includes one or more apertures 412 that extend into the hollow core that permit pressurized fluid to flow into the hollow core.

Mounted to the bottom end of the shaft 144 is the mandrel 414. The mandrel 414 has a hollow core that is in fluid communication with the hollow core of the shaft 144. The mandrel 414 has a number of apertures through which pressurized fluids may flow. The ports are distributed around the mandrel side walls, and at the tip end of the mandrel 414. In some embodiments, the mandrel may be integrated in a unitary construction with the shaft 144. In other embodiments, the mandrel may be removably attached to the shaft, such as by a threaded coupling, for example. In some applications, a mandrel moving at high velocity may fail and break. Mandrels may be made from relatively inexpensive plastics, stainless steel, aluminum, or exotic materials, depending on the materials being processed and the type of operation being performed.

The shaft 144 may be inserted through the central opening of a chimney clamp 416, the chimney 132, an upper bushing 420, a lower bushing 421, the winding tube 422, the pressure tube 136, and the pin wrap motor 140. The chimney 132 may be a tubular shaped element with an array of apertures arranged to permit pressurized fluid to exhaust after passing through the bullet seat 408. The chimney clamp 416 retains the chimney 132 in the pressure tube 136.

The pressure tube 136 may be a cylindrical shaped object with an open core. A portion of the pressure tube 136 has a reduced outer diameter that may facilitate forming a sealable coupling of the gear sector 146 and the magnetic air bearing 148 around the pressure tube 136, as can be seen in FIG. 3B. The pressure tube input port 306 in the reduced outer diameter portion of the pressure tube 136 provides a passage way for the pressurized fluid to flow from the pressure cavity 304 into the pressure tube 136.

The bushings 420, 421 retain the winding tube 422 in the pressure tube 136 and may provide a low-friction, axially slidable bearing surface for the shaft 144.

A pressurized annular volume, which may be defined radially between the outer surface of the winding tube 422 and the inner wall of the pressure tube 136, and defined axially between the bushings 420, 421, may be pressurized by fluid entering via the pressure tube input port 306. Under normal operating conditions, all of the apertures 412 are maintained within this pressurized annular volume between the bushings 420, 421. Maintaining the apertures 412 within this pressurized annular volume permits the fluid flow path through the apertures 412 to remain unblocked.

The winding tube 422 may be formed of a thin metal (e.g., steel) tube that contains a series of windings that form a stator of the linear motor (see FIG. 5A). The windings can be energized in a controlled manner by the motor controller 220 to interact with the magnetic fields of the magnets in the shaft 144 to impart a linear force on the shaft 144. The windings may be distributed throughout the winding tube 422, separated by spacers that provide gaps between the windings. The winding tube 422 includes an array of apertures that permit a fluid in the pressurized annular volume around the winding tube 422 to flow into the interior volume of the winding tube 422 through the gaps between the windings. The winding tube 422 is described in further detail with reference to FIG. 5A.

The pin wrap motor 140 of this embodiment further includes a pin wrap motor housing retainer 424, a rotor 428, a stator 430, and a pin wrap motor housing 432. The wrap pin 142 is mounted to the rotor 428. The stator 430 is mounted in the wrap motor housing 432. The bottom end of the shaft 144 extends through the hollow core of the rotor 428, where it may be removably coupled to the mandrel 414.

A continuous lumen extends through the hollow core of the shaft 144 from the bullet seat 408 to the mandrel 414. In one embodiment, when the bullet 402 is on the bullet seat 408, the upper end of the lumen is blocked. When the shaft 144 is stationary, the pressurized fluid flow may be sufficient to support the weight of the bullet 402 so that it does not contact the bullet seat 408, leaving the upper end of the lumen unblocked. However, when the shaft accelerates upward, the inertia of the bullet 402 may be sufficient to cause the bullet 402 to block the upper end of the lumen.

Accordingly, the path for pressurized fluid entering the pressure tube 136 through the pressure tube input port 136 extends through the array of holes in the winding tube 422, between the gaps formed by the spacers between the windings, through the aperture(s) 412, and into the central lumen in the shaft 144. If the bullet seat 408 is not blocked by the bullet 402, then the pressurized fluid may flow through the bullet seat 408, and exhaust out through the chimney 132. However, if the bullet seat 408 is blocked by the bullet 402, then the pressurized fluid may flow out through apertures in the mandrel 414.

Figure 4B:
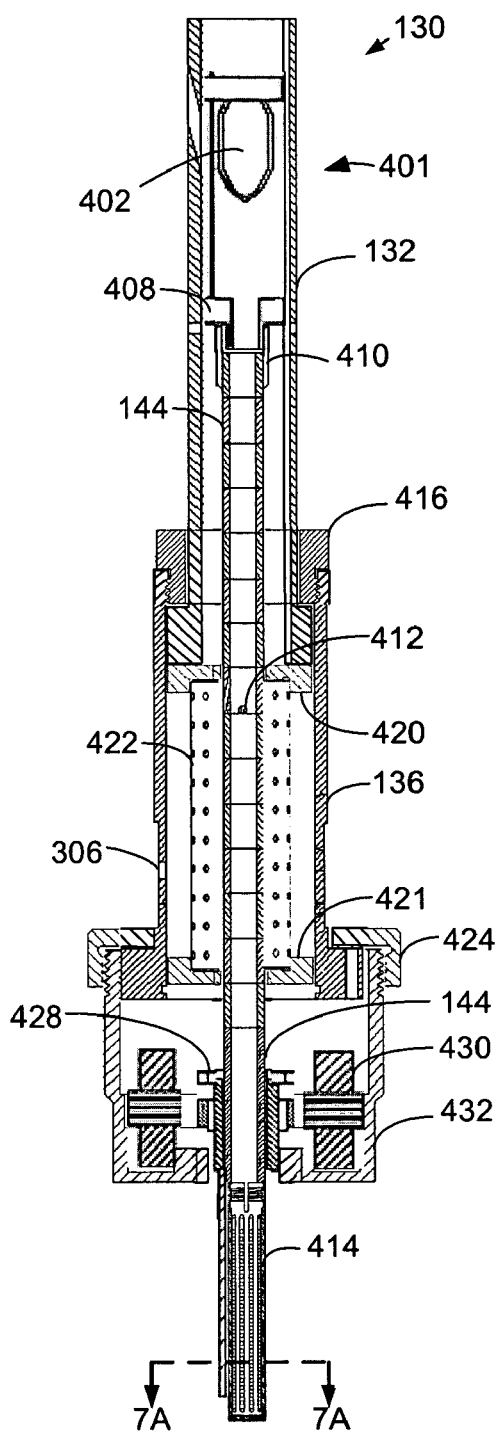
Figure 4C:
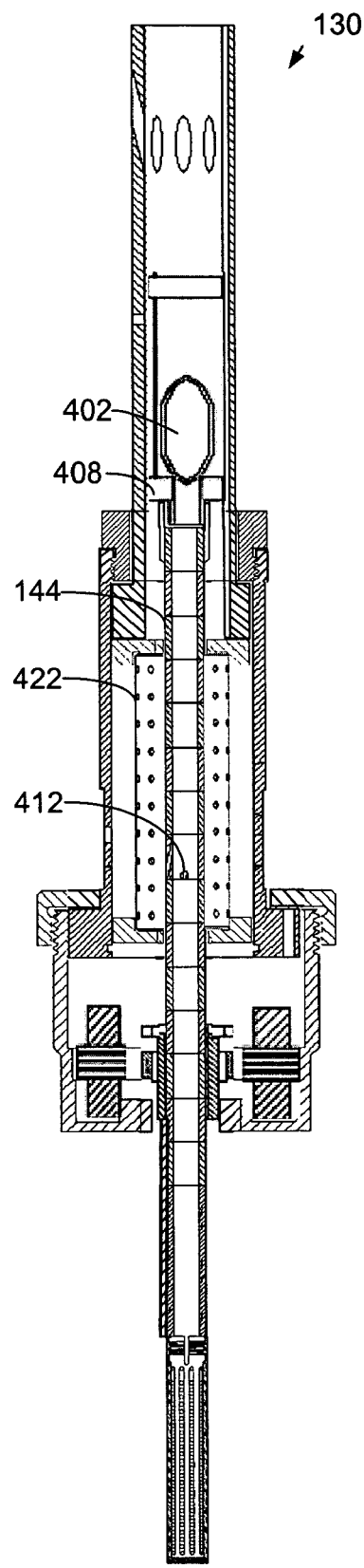

A cross-section of a partially assembled (without gear sector 146 and magnetic air bearing 148) linear actuator sub-assembly 130 is shown in a retracted state in FIG. 4B, and in an extended state in FIG. 4C.

In FIG. 4B, the inertial valve assembly 401, the shaft 144, and the mandrel 414 may be assembled together and installed as follows. First, the bushings 420, 421, which each have a ring groove to receive an end of winding tube 422, are installed in the pressure tube 136. Next, the inertial valve assembly 401 is placed into the chimney 132. These elements are then inserted into the pressure tube 136, and the chimney clamp 416 is placed over the chimney 132 and coupled to the pressure tube 136. The rotor 428 is then placed over the mandrel 414 and the shaft 144. The stator 430 is placed inside the pin wrap motor housing 432, which is inserted onto the shaft 144, where it can be secured to the rest of the assembly by the pin wrap motor housing retainer 424.

Once assembled, the bushings 420, 421 may provide a slip fit with the shaft 144, allowing the shaft 144 to travel in a reciprocating axial (e.g., z-axis) motion with respect to the winding tube 422. The shaft 144 and the winding tube 422 may form a linear motor that can be actuated by appropriately energizing the coils in the winding tube 422.

FIG. 4B shows the linear actuator sub-assembly 130 in an exemplary position with the mandrel 414 fully retracted. FIG. 4B also illustrates how a pressurized fluid medium present in the core of the pressure tube 136 may flow through the apertures in the winding tube 422. This flow may remove heat generated by winding currents, for example. This cooling may enable the linear motor to operate above current ratings of an uncooled motor, particularly where those ratings are at least based in part on thermal characteristics and/or a maximum acceptable temperature rise.

In one embodiment, the linear motor may be effectively cooled during operation when the pressurized fluid from the pressure cavity 304 flows through the pressure tube input port 306 into the annular volume between the bushings 420, 421. The pressurized fluid flows through the apertures in the winding tube 422 and between the spaced-apart windings. From there, the pressurized fluid flows through the one or more apertures 412, which may be near the upper bushing 420 in this example, and into the central lumen in the shaft 144.

In this retracted position, the pressurized fluid may flow upward, lifting the bullet 402 so that it does not contact the bullet seat 408. In one embodiment, the upward flow may be rotational, at least in part, as a result of the combination of the axial, radial, and tangential components of the one or more apertures 412. As a further consequence in some embodiments, the upward flow may also impart a negative (i.e., vacuum) pressure at the mandrel 414. This negative pressure may be sufficient at least to hold onto a separator paper cylindrically that may be formed substantially around the mandrel 414.

FIG. 4C shows the linear actuator sub-assembly 130 in an exemplary extended state. The linear actuator sub-assembly 130 may be in the extended state near the bottom of the separator paper insertion motion, for example.

In this extended state, the pressurized fluid from the pressure cavity 304 may flow through the pressure tube input port 306 into the annular volume between the bushings 420, 421. The pressurized fluid may then flow through the apertures in the winding tube 422, and through the one or more apertures 412, which may be near the lower bushing 421 in this example, and into the central lumen in the shaft 144.

When this extended state occurs near the bottom of the insertion motion, the pressurized fluid flows toward the mandrel 414 because the bullet 402 is blocking the central aperture in the bullet seat 408. In one embodiment, the downward inertia of the bullet 402 may overcome the upward force of the pressurized fluid exhausting through the bullet seat 408 because the shaft 144 decelerates (i.e., has an upward acceleration), which results in the bullet 402 having a faster downward velocity than the shaft 144. When this occurs, the bullet 402 may temporarily block the upward air flow.

This temporary blockage may be advantageous in the exemplary application of inserting separator papers into battery casings. When the bullet 402 contacts the bullet seat 408, the pressurized fluid may quickly reverse from an upward flow to a downward flow. This may effectively produce a quick pressure reversal at the mandrel 414, causing paper that was being held by vacuum pressure to be blown off by a burst of positive pressure. This "blow off" effect may facilitate rapid separation of the paper from the mandrel, allowing the mandrel to be extracted rapidly and without pulling the separator paper out of the battery casing.

Thus, the inertial valve assembly 401 may reduce extraction time and reduce quality problems that could result from improper extraction motions. Accordingly, high production yield and high throughput may be achieved with a constant pressure source in combination without an inertial valve.

An exemplary embodiment of the winding tube 422 is illustrated in FIG. 5A. The winding tube 422 includes a sleeve 502, which may be formed of a high magnetic permeability material, such as nickel, iron, cobalt, steel, or alloys thereof. The sleeve 502 contains a number of windings 504 that are axially separated by non-conducting spacers 506. The spacers form gaps 510 between each of the windings 504.

In this embodiment, the sleeve 502 is fabricated with a slot to facilitate connecting the leads of the windings to an external drive circuit, which may be a power electronic circuit included in the motor controller 220, for example.

In addition to the slot, some apertures in the sleeve 502 coincide with the gaps 510 to provide a path for pressurized fluid to flow between the windings during operation.

FIG. 5B illustrates features of the shaft 144 according to an exemplary embodiment. At least a portion of the shaft 144 includes a tube 512 that contains magnetic structures that may interact with currents in the windings 504 to generate axial forces (i.e., axial thrust) that can accelerate the shaft 144.

The tube 512 may be constructed of a thin, lightweight non-ferromagnetic material such as plastic, titanium, aluminum, or stainless steel, for example. The tube 512 may contain a number of axially polarized toroidal permanent magnets 514. Adjacent permanent magnets 514 are separated by toroidal spacers 516. In one embodiment, an inside diameter of the spacers 516 may be substantially equal to an inside diameters of the magnets 514 so that a substantially uniform inside diameter results when the magnets 514 and spacers 516 are assembled into the tube 512.

In this embodiment, like magnetic poles (i.e., north-north, south-south) of adjacent permanent magnets 514 face one another. The spacers 516 separate adjacent permanent magnets 514, thereby shaping the magnetic field. In this embodiment, magnetic flux lines from adjacent like poles may combine to produce a flux component directed substantially radially from each spacer 516. When the shaft 144 is inserted in the winding tube 422, some of these radially directed flux lines may pass through some of the windings 504 in the winding tube 422. The high magnetic permeability of the sleeve 502 of the winding tube may provide a relatively low magnetic reluctance path that may promote and shape the radial component of the magnetic flux produced by magnets 514.

In addition to the magnetic structures that allow the shaft 144 to generate thrust as a linear motor, the shaft 144 also provides a flow path for pressurized fluid. In this embodiment, one of the toroidal spacers 516 includes two lumens that provide fluid communication between the apertures 412 and the central core lumen of the shaft 144. In some embodiments, the lumens in the spacer 516 may include radial, tangential, and axial components, which may tend to impart a rotation to pressurized fluid as they flow through the core lumen of the shaft 144. Other embodiments may include more than one spacer 516 having lumens, and/or each spacer 516 may include a number of lumens to correspond to the number of apertures 412. The lumens in at least some of the spacers 516 may be designed to impart a desired flow pattern to pressurized fluid as it flows through the core lumen of the shaft 144.

In one embodiment, the magnets 514 and spacers 516 may be assembled into the shaft 144 by inserting them into the tube 512 and then bonding them in place using an adhesive and/or epoxy. In another embodiment, the magnets 514 and spacers 516 may be press fit into the tube 512. In some embodiments, the spacers 516 may include a groove in the outside diameter for retaining epoxy, for example. The magnets 514 may be arranged in the tube 512 in a manner such that like poles of adjacent magnets 514 face each other. After the magnets 514 and spacers 516 have been inserted into the tube 512, the outside diameter of the tube, some embodiments may be turned on a lathe in order to increase the straightness of the tube 512.

Figure 6:
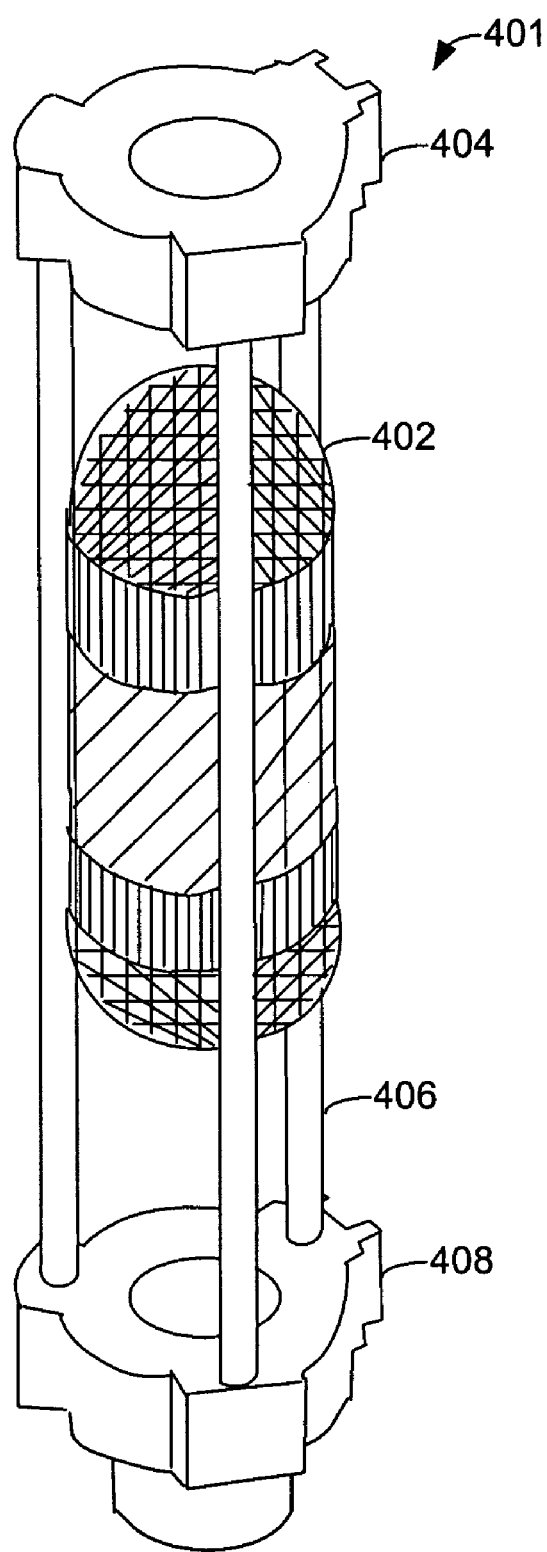
FIG. 6 is a perspective view of an exemplary inertial valve for the linear actuator of FIGS. 4A-4C.

FIG. 6 shows a perspective view of the inertial valve assembly 401, an embodiment of which was described with reference to FIG. 4A. The inertial valve assembly 401 includes the bullet 402, the bullet stop 404, the retainer cage 406, and the bullet seat 408. In this embodiment, the bullet 406 has a cylindrical shape with tapered ends provides a more clear illustration of the retainer cage 406 that retains the bullet 402 inside the inertial valve assembly 401.

The bullet seat 408 may provide a central open port arranged as a cylindrical aperture. The bullet seat 408 includes a chamber that conforms to the shape of the bullet 402 to substantially block the aperture in the bullet seat 408 when the bullet comes into contact with it.

The bullet 402 may be constructed, for example, of materials that give it a damped response to impacts on the bullet seat 408 and/or the bullet stop 404. In another embodiment, the bullet 402 may implement a shock absorbing design.

In this example, the bullet 402 has a composite construction that is made up of various materials. The central region of the bullet 402, for example, may consist of a material that has a relatively high density, which may contribute to a significant fraction of the inertia of the bullet 402, while the ends of the bullet 402 may consist of a material with highly damped properties to substantially reduce or eliminate bounce when striking the surface of the bullet seat 408 and/or the bullet stop 404.

In one embodiment, the bullet may be similar to a bean bag having a substantially hollow urethane sphere that is partially filled with some materials. The materials may include, for example, small spheres of plastic, metal, but may also include sand, water, oil, or other material. The urethane sphere may be filled between about 5% and 90% full, such as between about 5% and about 30% full, between about 25% and about 50% full, or between about 50% and about 75% full, or about ⅔ full, for example.

Figure 7A:
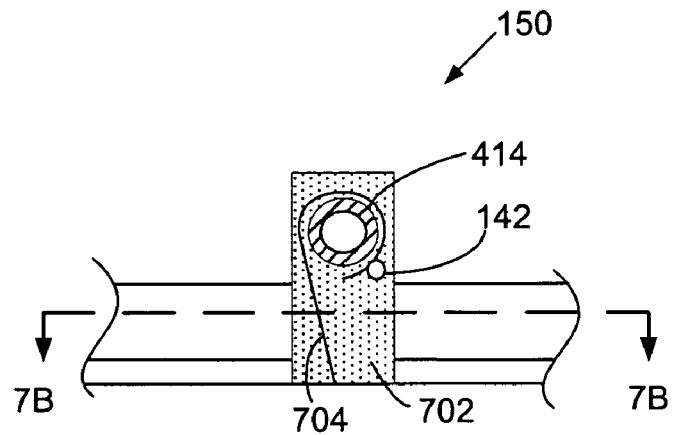
FIG. 7A is a top view of an exemplary feed sub-assembly showing a tube paper separator being wrapped onto an exemplary mandrel, from a cross-section taken as indicated on FIG. 4B.
Figure 7B:
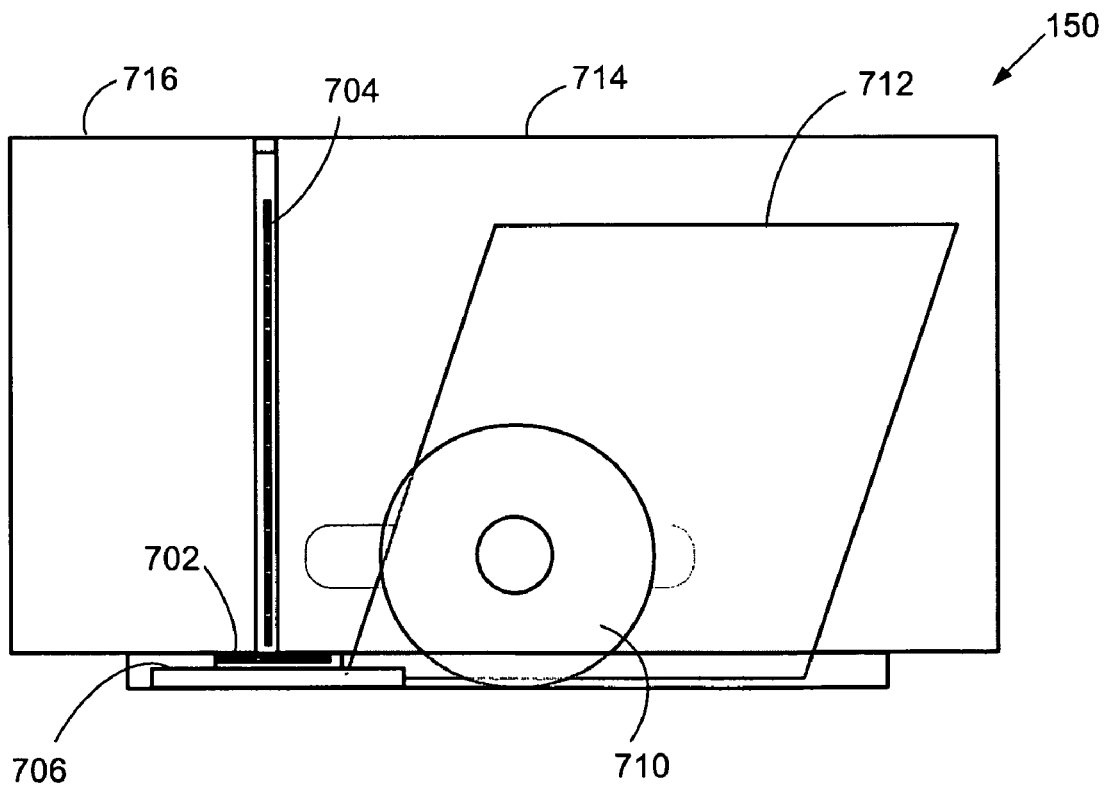
FIG. 7B is a front view of the exemplary paper feed-and-cut sub-assembly, from a cross-section taken as indicated on FIG. 7A.

FIGS. 7A, 7B show views of the feed-cut (FC) sub-assembly 150. FIG. 7A is a cross-sectional view taken through the mandrel 414 from the line 7A in FIG. 4B. FIG. 7B is a front view of the feed-cut assembly 150 taken at the line 7B in FIG. 7A.

FIG. 7A shows a length of square separator paper 702 and a length of tube separator paper 704 that have been dispensed by the FC sub-assembly 150, as well as the wrap pin 142 and the mandrel 414.

After an appropriate length of tube separator paper has been dispensed, the pin wrap motor 140 of the linear actuator assembly 130 may rotate, causing the wrap pin 142, to advance in a path around the circumference of the mandrel 414. This motion wraps the tube separator paper 704 around the mandrel 414. At this time, both the square separator paper 702 and the tube separator paper 704 may be held to the mandrel 414 by a vacuum force induced in the core of the mandrel 414 by operation of the pressurized fluid flow, as described above. At this stage, the separator papers 702, 704 may be cut to length.

To illustrate how the FC sub-assembly 150 can cut the separate papers, FIG. 7B shows a square separator paper 702, a tube separator paper 704, a platform 706, a square separator paper knife 710, a tube separator paper knife 712, a main block 714, and an end block 716. In one example, the knives 710, 712 may be coupled to a linear actuator, such as a stepper motor (not shown) with a worm gear located in the main block 714. The knives 710, 712 may be advanced toward the separator papers 702, 704 after the square separator paper 702 and the tube separator paper 704 have been dispensed and at least partially captivated by the mandrel 414. In some embodiments, the square separator knife 710 may cut against a surface of the platform 706. The tube separator knife 712 of this example has a leading bottom edge that cuts at a single point of interference with the block 716. As the knife 712 advances, the interference point moves upward.

In this example, the end block 716 may be spaced apart from the main block 714 by spacers (not shown) to permit the separator paper 704 to pass through the gap between the blocks 714, 716. In one example, the end blocks 716 is held in place to the main block 714 by magnetic attraction force (e.g., permanent magnet or electromagnet) generated in either or both of the blocks 714, 716. In some embodiments, the end block 716 may be removed without use of a tool by a small amount of manual pressure to overcome the magnetic attraction force. Removal of the end block 716 may be desirable, for example, for loading the papers 702, 704 into the feed cut sub-assembly 150, or to provide access for maintaining (e.g., cleaning or lubricating) the knife motor 252.

In some implementations, a horizontal surface is provided to support dispensed end of the square separator paper 702. This may advantageously promote, for example, rapid and repeatable acquisition of the paper 702 by vacuum force to the mandrel. In the embodiment of FIG. 7A, no support surface is provided directly under the tip of the mandrel, so acquisition of the paper 702 may rely, at least in part, on the stiffness of the paper. In this embodiment, the edges of the square separator paper 702 may be formed around the end of the tube separator paper 704 as it is inserted into the casing.

Figure 7C:
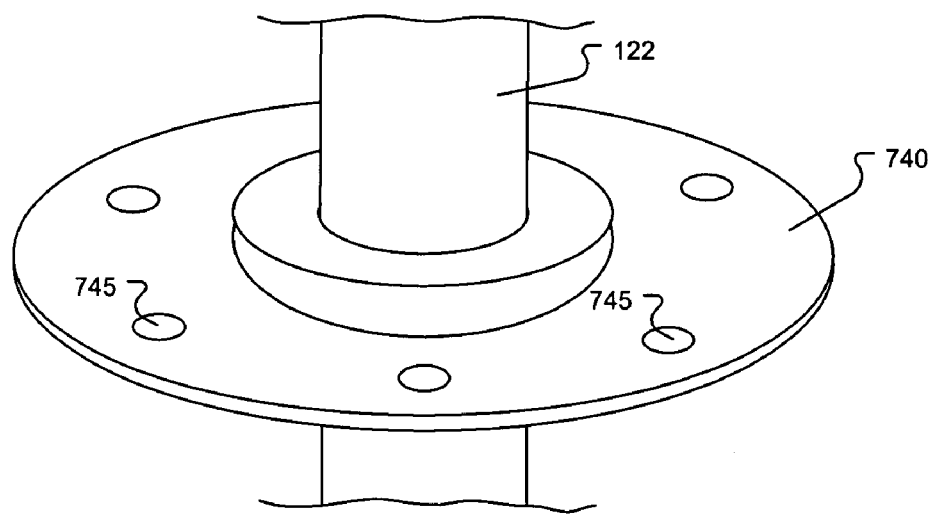
FIGS. 7C-7D are perspective views of exemplary tray embodiments to support and/or form separator paper.
Figure 7D:
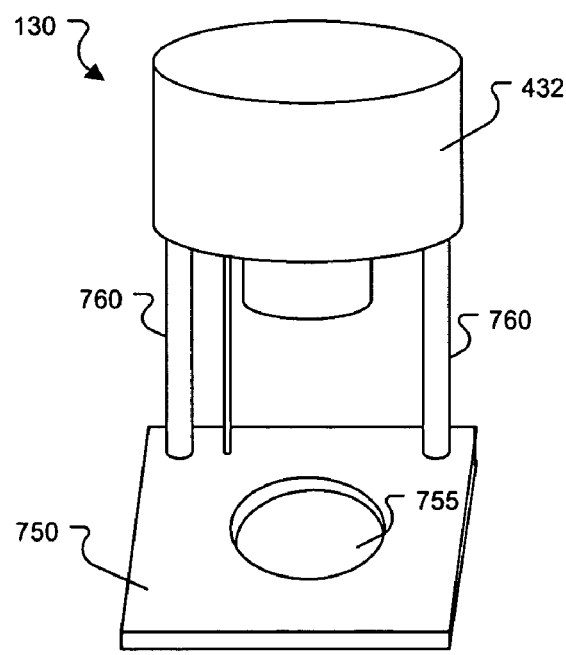

Two exemplary embodiments that may support the dispensed end of the square separator paper 702 are illustrated in FIGS. 7C-7D.

FIG. 7C shows an exemplary disk 740 mounted to the sprocket 122. The disk 740 has a plurality of apertures 745 that may be sized, in some embodiments, to form the edges of the square separator paper 702 as the mandrel extends downward to perform an insertion operation. Over at least a portion of the travel around the sprocket 122, a cell to receive a tube and square separator is registered in vertical alignment with one of the apertures 745. In one embodiment, the disk 740 rotates with the sprocket 122.

FIG. 7D shows an exemplary tray 750 that is attached to and reciprocates with the linear actuator assembly 130. The tray 750 has an aperture 755 that may be sized, in some embodiments, to form the edges of the square separator paper 702 as the mandrel extends downward to perform an insertion operation. The tray 750 is supported by members 760, which are, in this example, rigidly attached to the motor housing 432.

Figure 8:
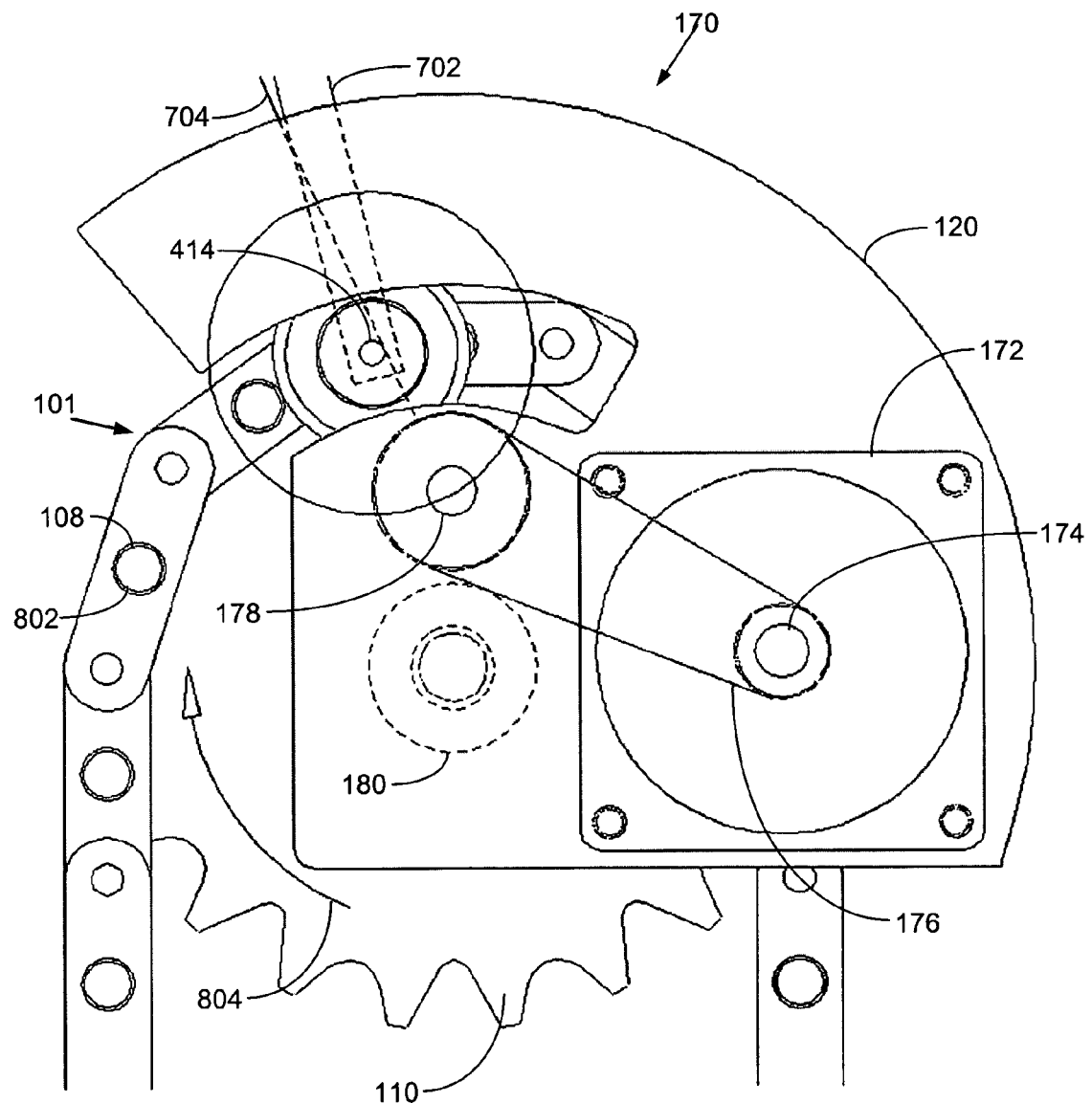
FIG. 8 is a top plan view showing an exemplary positioning sub-assembly of the high speed assembly system of FIG. 1.

FIG. 8 shows an embodiment of the actuator positioning sub-assembly 170 that is mounted on the base plate 120. The actuator positioning sub-assembly 170 includes the assembly positioning motor 172, the motor drive shaft 174, the belt 176, the spindle 178, and the belt tensioner 180. The spindle 178 may be coupled to a gear (not shown), such as a spur or pinion gear, for example, that meshes with the gear sector 146, In this example, the belt 176 couples mechanical rotation of the motor drive shaft 174 to the spindle 178, forming a transmission system, an example of which is the transmission system 214. In other systems, alternative transmission systems may be used, such as direct drive applications, for example.

In this example, FIG. 8 also shows a battery casing holder 108 and a battery casing 802 traveling along a conveyor assembly 101 in a direction of rotation 804 around the sprocket 110. In the embodiment of this example, a tensioner 180 is provided to reduce the variations in the tension of the belt 176. In this particular example, the motor 172, spindle 178, spur gear (not shown), and gear sector 146 may be driven by the motor 172 to provide a reciprocating motion that moves the linear actuator sub-assembly 130 in an x-y (i.e., substantially horizontal) plane. For example, the sub-assembly 170 may reciprocate the linear actuator sub-assembly 130 along an arc shaped path in the x-y plane. The path may substantially overlap a track in a parallel plane in which battery casings advance along the conveyor assembly 101. Accordingly, by moving the linear actuator assembly 130 along this path in coordination with advancing battery casings, the actuator positioning sub-assembly 170 is able to align the insertion assembly system 102 to perform the paper separator insertion operations with various types of conveyor systems, including continuous motion type conveyor systems, for example.

Figure 9:
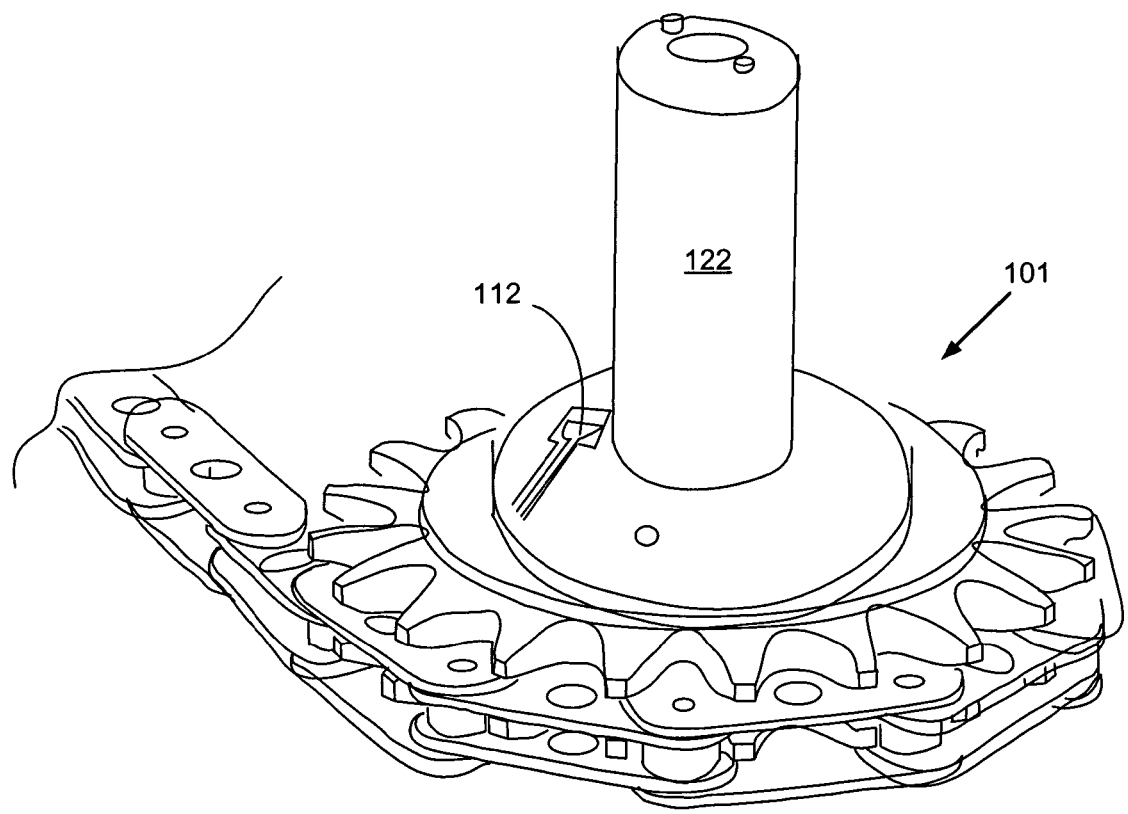
FIG. 9 is a perspective view of a sprocket at which the high speed assembly system of FIG. 1 may be installed on an exemplary assembly line.

The insertion assembly 102 is adapted for flexible manufacturing, and may be applied in or adapted to various applications and in various configurations. FIG. 9 shows a portion of the exemplary conveyor system 101 on which embodiments of the insertion assembly system 102 may be installed. The conveyor system 101 includes the sprocket 122 and the conveyor position sensor 112, examples of which have been discussed above. The exemplary insertion assembly system 102 has the flexibility to be installed on existing conveyor systems with little or no interruption of the existing line. In one example, the insertion assembly system 102 may be installed on any available and suitable (i.e., has an appropriate radius, for example) sprocket of a process flow line, but may also be installed on a table top, stand, platform, or suspended from a horizontal and/or vertical support structure, such as a ceiling or a support column. Embodiments may accommodate a wide range of sprocket sizes, for example, by providing appropriately sized and shaped air bearing sector 148 and the corresponding vertical mating surface under the base plate 120. The insertion assembly system 102 may be operated and/or controlled independently or in substantial coordination with the conveyor system 101 being used to advance battery casings. In one embodiment, the only direct interface between the conveyor system 101 and the high speed assembly system 100 may be the conveyor position sensor 112.

In some applications, more than one insertion assembly system 102 may be applied on a single conveyor assembly 101. This may, for example, provide redundancy (i.e., back-up, such as during maintenance), or parallelism to increase throughput rate. For example, if two insertion assembly systems 102 are installed on a single conveyor assembly line, throughput capability for the insertion operation may be increased. In another example, two insertion assembly machines on the same conveyor assembly line may be configured to perform different operations, and the operations and associated configurations may be adapted for different production runs, products, and techniques.

Figure 10:
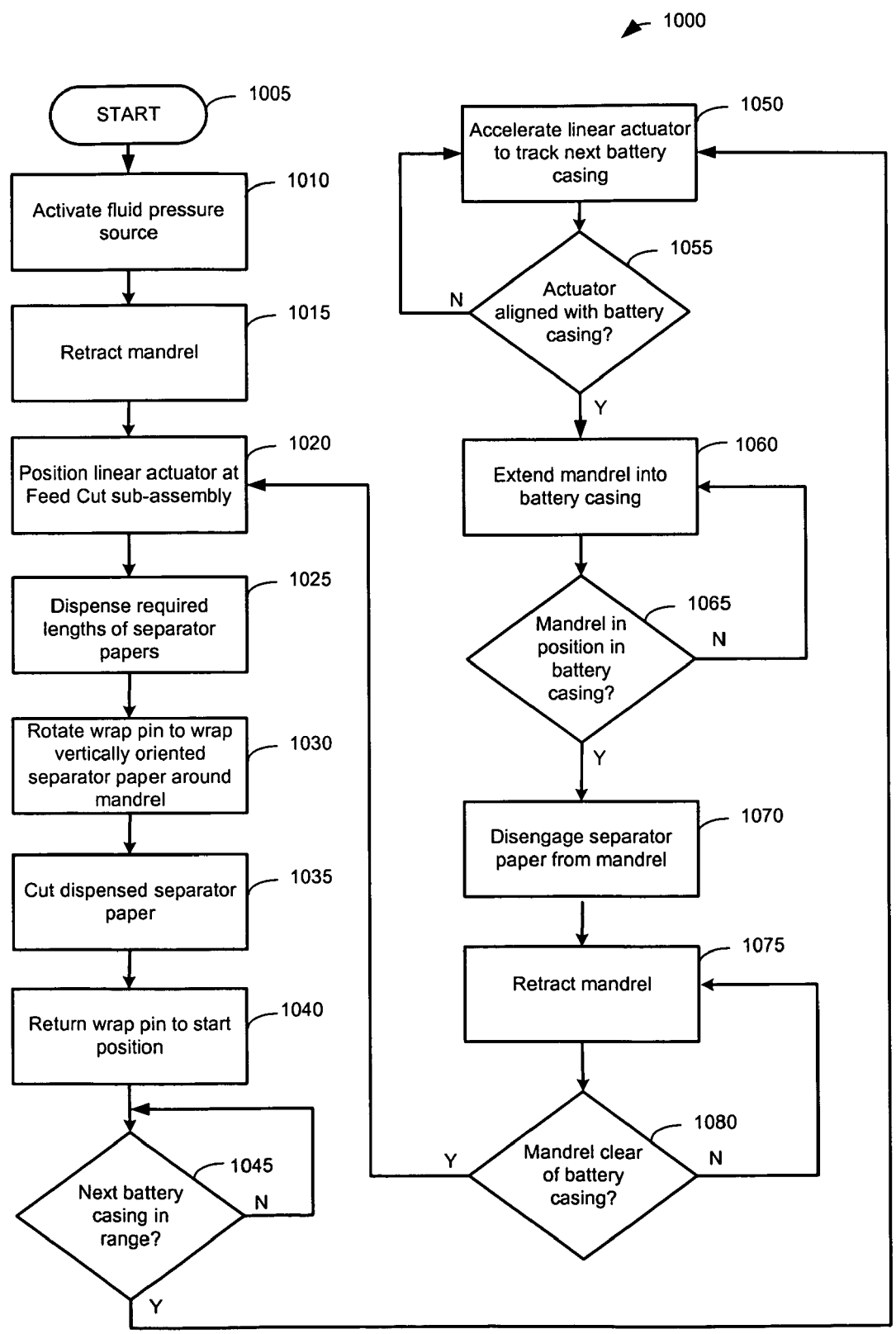
FIG. 10 is a flowchart of a method of operating the system of FIG. 1 to insert tube and square separator papers into battery casings.

FIG. 10 represents an exemplary method 1000 for operating the insertion assembly 102 to insert separator paper as described above. The method 1000 includes operations that may be performed generally by the insertion assembly 102. The operations may be performed under the control, supervision, and/or monitoring of the master controller 206 and/or the controllers 210, 220, 230, 240, 250, or in combination. Operations may also be supplemented or augmented by other processing and/or control elements that may be incorporated by the assembly 102. Some or all of the operations may be performed by one or more processors executing instructions tangibly embodied in a signal. The processing may be implemented using analog and/or digital hardware or techniques, either alone or in cooperation with one or more processors executing instructions.

The method begins at step 1005 when the system 102 may be, for example, powering up or resetting and/or otherwise preparing for insertion operations. The fluid pressure source 202 may be activated at step 1010, for example, by performing an operation to open a controllable valve to provide fluid communication from the fluid pressure source to the pressure input port 302. The mandrel 414 may be retracted at step 1015 to a position, such as the retracted position described with reference to FIG. 4B. At step 1020, the actuator positioning motor 172 may position the linear actuator sub-assembly 130 at the FC sub-assembly 150. The paper feed motor 232, for example, may dispense, at step 1025, appropriate lengths of the substantially vertical separator paper and the substantially horizontal separator paper. The pin wrap motor 140 may, at step 1030, rotate the wrap pin 142 to wrap the vertically oriented separator paper around the mandrel 414. At step 1035, the knife motor 252 may drive the knives 710, 712 to cut the dispensed ends of the separator papers. In this example, the pin wrap motor 140 returns the wrap pin 142 to its initial position at step 1040, and, in some embodiments, may involve a reverse wrap motion to form the newly cut end of the tube separator paper to the mandrel 414.

At this point, the tube separator has been formed, and both the tube and square paper separators have been cut from the roll stock and held to the mandrel by vacuum pressure. The free overlapping end of the tube separator is retained in close proximity to the mandrel 414 by the wrap pin 142. With this payload, the mandrel 414 may be put into a position to insert the payload into a battery casing on the conveyor assembly 101.

At step 1045, the controller 206 may check the conveyor position sensor 208 to determine whether the next battery casing to receive separator paper is in range to start tracking. In some examples, the controller 206 may wait before accelerating the linear actuator 130, and in other examples, the controller 206 may determine an optimal trajectory and send a command, for example, to minimize the energy and/or time required to track the next battery casing for example.

When the controller 206 determines that the next battery casing is in range to begin tracking it, the linear actuator 130 may be accelerated in the x-y plane at step 1050 by the actuator positioning sub-assembly 170. The controller 206 may repeatedly check whether, at step 1055, the actuator assembly 130, and specifically the mandrel 414, is adequately aligned with the battery casing. When sufficient alignment is achieved, the mandrel 414 is extended, as described with reference to FIG. 4C, by action of the linear motor at step 1060. At step 1065, the position of the mandrel in the battery casing may be monitored, for example, by the shaft position sensor 134, and the mandrel may continue to be extended until the desired position is reached.

After the mandrel 414 has been properly positioned in the battery casing, the separator papers are disengaged from the mandrel 414. In some embodiments, described above, this may be achieved by a "blow off" effect produced when the bullet 402 in the inertial valve 401 blocks the bullet seat 408. The blockage causes the upward flow of pressurized fluid to be redirected downward through the mandrel 414. This accomplishes a quick pressure change from vacuum to positive pressure at the mandrel. The positive pressure releases the separator-paper from the mandrel 414, so at step 1075, the mandrel 414 may be retracted, leaving the tube and square separator papers in the battery casing. As the mandrel 414 is being retracted, the controller 206 may monitor the shaft position sensor 134 to determine when the mandrel 414 has been extracted far enough to clear the battery casing. When that occurs, step 1020 is repeated, which requires the mandrel 414 be returned to the feed cut assembly 150 to prepare for the next operation.

In another embodiment, such as where no casing is involved, an object may fall off the mandrel instead of being blown off. Fall off may be accomplished, for example, by operating the motor so that vacuum force on the object is substantially reduced. In one embodiment, the vacuum force may be reduced when the jet holes 412 are substantially cut-off from the pressurized fluid source. This may be achieved when the jet holes 412 are substantially covered, for example, by the bearing 421 in the extended position, or by the bearing 420 in the retracted position. In another embodiment, the shaft is operated to move the jet holes 412 so that they are not between the bearings 420, 421.

FIGS. 11A-11G illustrate an exemplary cycle that includes a sequence of operations that may be performed in a paper insertion sequence. For purposes of illustrating the timing of a cycle in one embodiment, each of these figures includes a graphical time indicator. The indicators are approximate exemplary times, and may correspond to an exemplary throughput rate for the high speed assembly system 100 of about 500 cycles per minute.

Figure 11A:
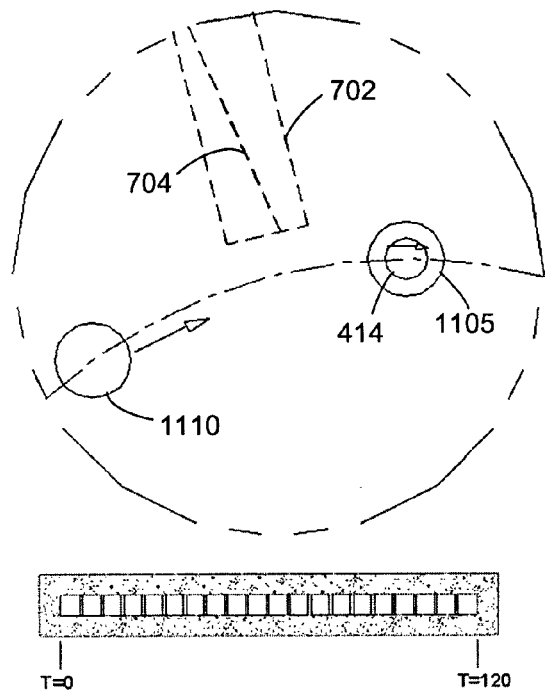
FIGS. 11A-11J are schematic illustrations of a sequence of operations performed by the high speed assembly system of FIG. 1 during an exemplary cycle of inserting tube-and-square paper separators into a battery casing on a continuous flow assembly line.

The sequence of illustrations begins in FIG. 11A by depicting an exemplary condition after a successful separator placement in a battery casing 1105 using the mandrel 414. The time of this step of the sequence is defined at t=0. The mandrel 414 is shown as it is being withdrawn from the battery casing 1105 for which the insertion process has just completed. Because the mandrel 414 has just been retracted, it is traveling along an exemplary continuous motion conveyor system at the same velocity as the battery casing 1105. A next battery casing 1110 is advancing along the same track taken by the battery casing 1105. The square separator paper ribbon 702 and the tube separator paper ribbon 704 are not being dispensed by the FC sub-assembly 150 (not shown).

Figure 11B:
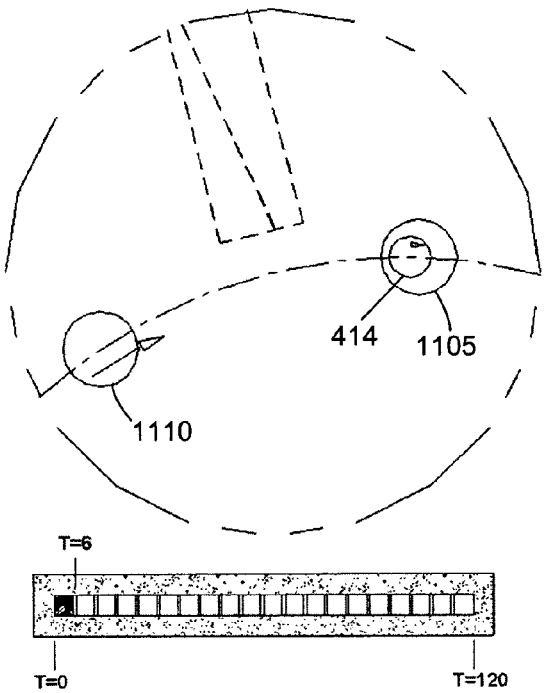

FIG. 11B shows the mandrel 414 decelerating in the x-y plane. This state may occur at approximately t=6 milliseconds in the paper insertion sequence.

Figure 11C:
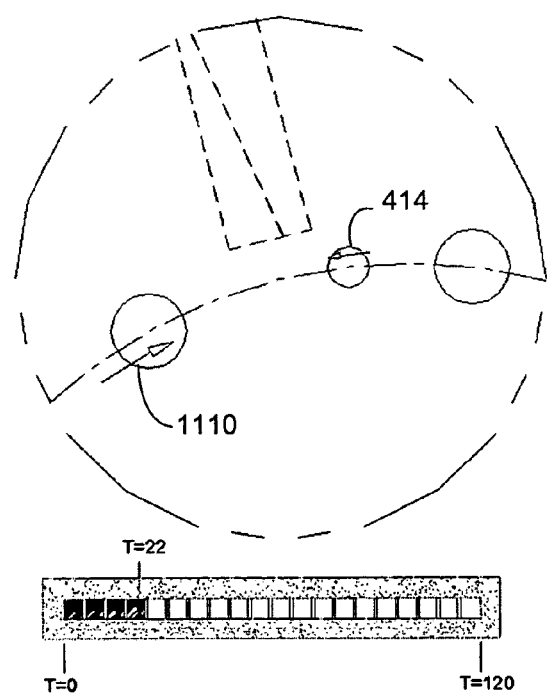

FIG. 11C shows the mandrel 414 accelerating toward the FC sub-assembly 150 (not shown). The battery casing 1110 is continuing to advance along the conveyor path. This state may occur at approximately t=22 milliseconds in the paper insertion sequence.

Figure 11D:
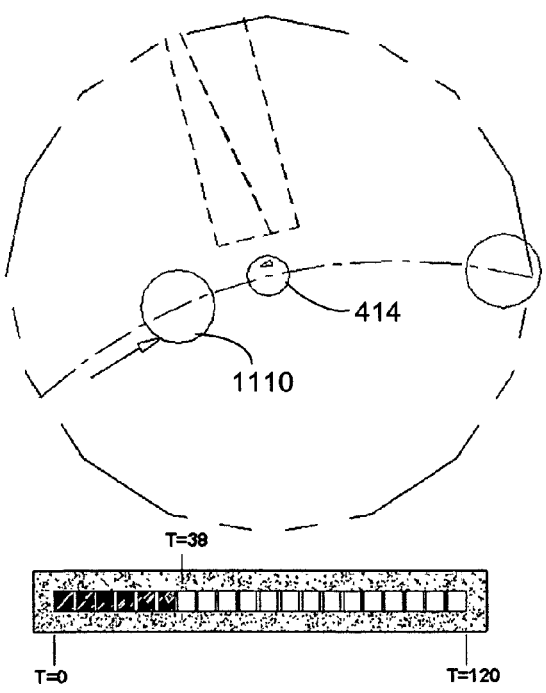

FIG. 11D shows the mandrel 414 decelerating as it approaches the FC sub-assembly 150. This state may occur at approximately t=38 milliseconds in the paper insertion sequence.

Figure 11E:
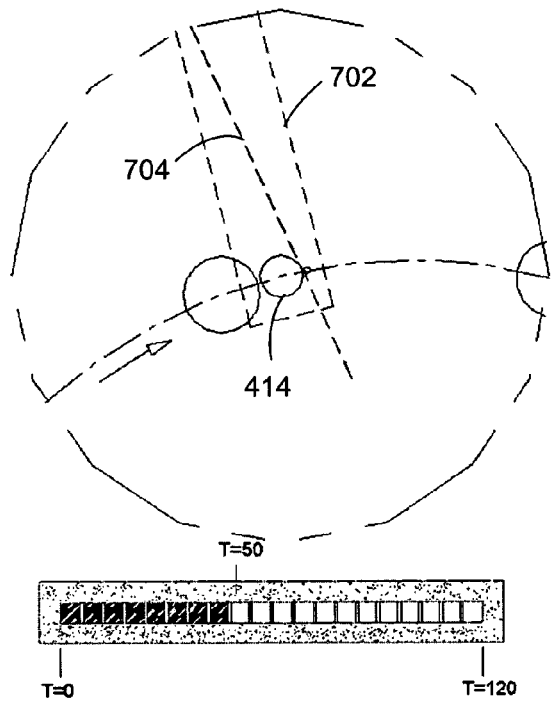

FIG. 11E shows the mandrel 414 in position at the FC sub-assembly 150 in preparation for receiving separator papers. A square separator paper ribbon 702 and a tube separator paper ribbon 704 have been dispensed to their respective appropriate lengths. This state may occur at approximately t=50 milliseconds in the paper insertion sequence.

Figure 11F:
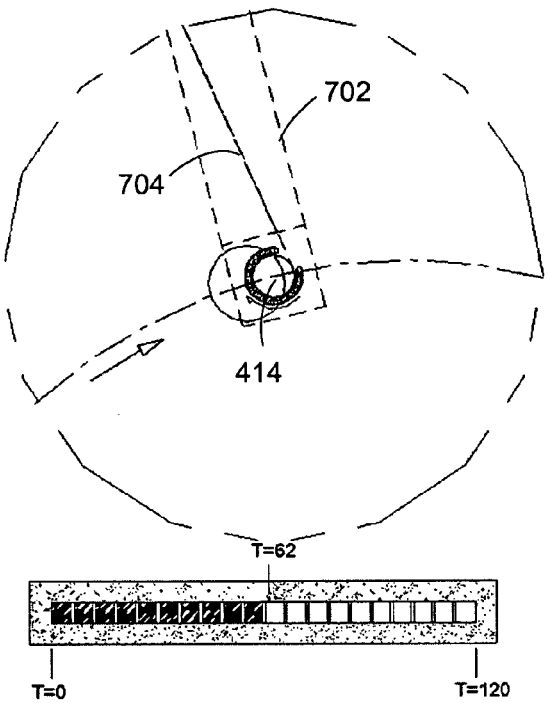

FIG. 11F shows the tube separator paper 704 being wrapped around the mandrel 414 by wrap pin 142 (not shown). The core of the mandrel 414 may be drawing a vacuum that can attract and hold the dispensed ends of the separator papers 702, 704. This state may occur at approximately t=62 milliseconds in the paper insertion sequence.

Figure 11G:
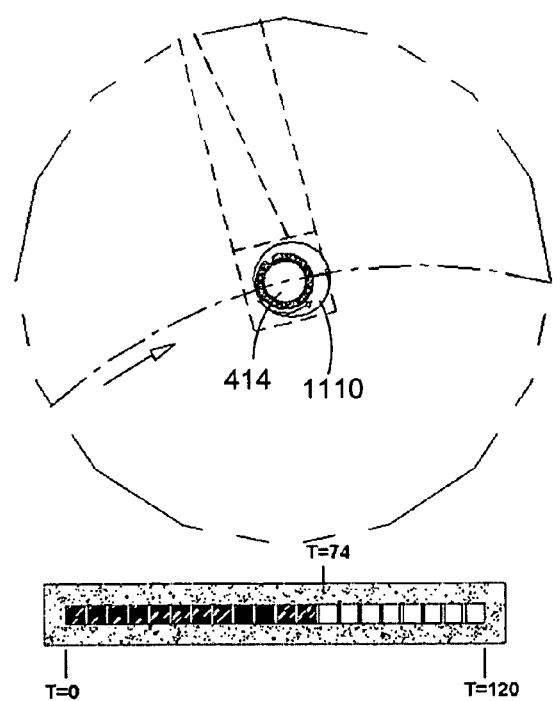

In FIG. 11G, the ends of the separator papers 702, 704 have been cut and the wrap pin 142 (not shown) has been rotated back to and past its original position by an additional angle of rotation sufficient to perform a "reverse wrap." The reverse wrap operation forms the cut end of the tube separator 704 to the mandrel. This state may occur at approximately t=74 milliseconds in the paper insertion sequence.

Figure 11H:
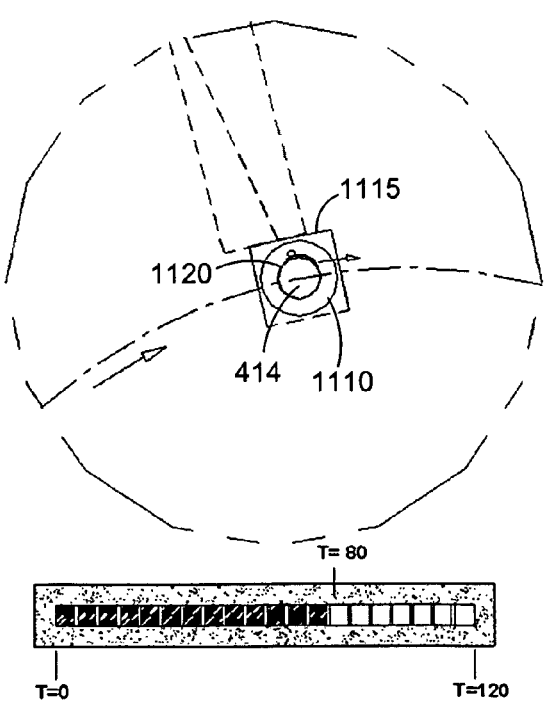

FIG. 11H shows the mandrel 414 accelerating to track the next battery casing 1110. The mandrel 414 is carrying a square separator 1115 at the end of the mandrel 414, and a tube separator 1120 formed circumferentially around the mandrel 414. The square 1115 and the tube 1120 are held to the mandrel 414 by the force of the vacuum in the core of the mandrel 414. This state may occur at approximately t=80 milliseconds in the paper insertion sequence.

Figures 11I, 11J:
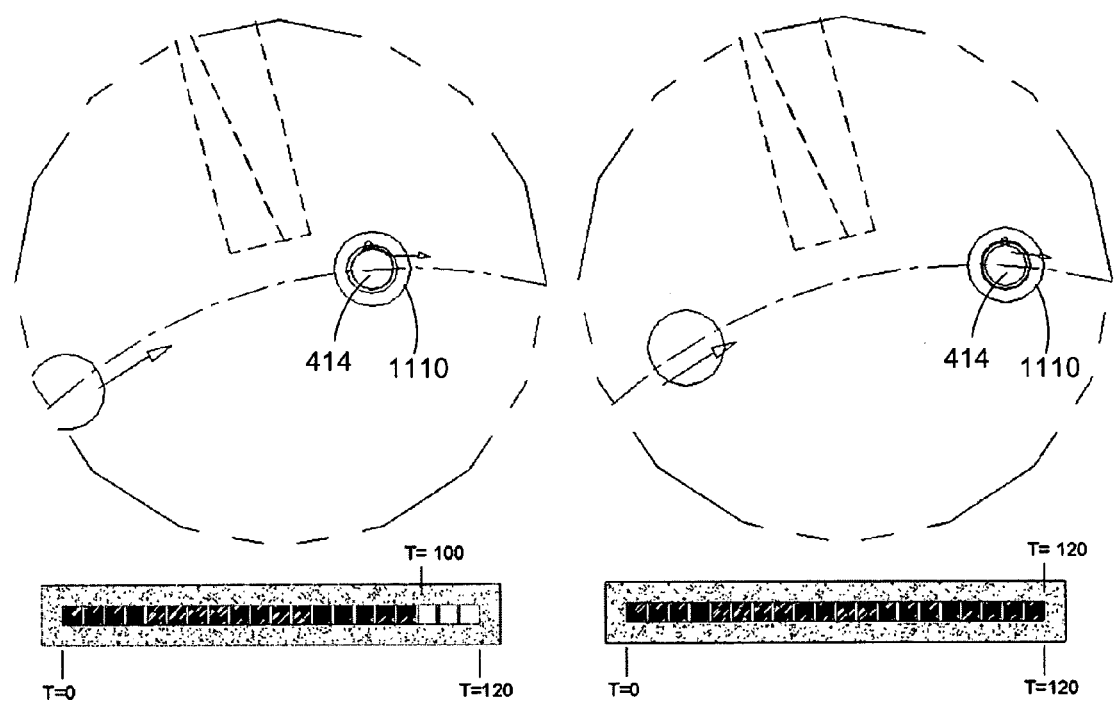

FIG. 11I shows the mandrel 414 positioned to be substantially in vertical alignment above the battery casing 1110. At this point, the linear motor accelerates the mandrel 414 into the battery casing. The mandrel 414 decelerates as it approaches the bottom of the down stroke, which causes the inertial valve to block the aperture in the bullet seat 408, which produces the quick pressure reversal in the mandrel 414, as described above. This state may occur at approximately t=100 milliseconds in the paper insertion sequence.

FIG. 11J shows the mandrel 414 being extracted from the battery casing 1110 by an upward acceleration of the linear motor. This state may occur at approximately t=120 milliseconds in the paper insertion sequence. In one example, the acceleration profile may be such that bullet is maintained against the seat 408 substantially before and after the shaft reaches its maximum extension. As such, the motion profile may be controlled in a way that substantially reduces or eliminates bounce of the bullet from the seat near the bottom of an extension motion. In paper insertion applications, for example, minimizing bullet bounce may advantageously reduce or eliminate inadvertent re-acquisition of the separator paper.

Although some embodiments have been described, other embodiments are possible. For example, the linear actuator may be operated as a motor (i.e., converting electrical energy into mechanical energy) or as a generator (i.e., converting mechanical energy into electrical energy). The linear actuator may use various winding configurations, including overlapping and/or non-overlapping windings, various numbers and spacings of poles, and the windings may have various phase connections. The winding phases, for example, may be connected in WYE or DELTA configurations, and may or may not use a neutral connection.

The linear motor may be controlled using a variety of drives that apply electrical waveforms to the stator to produce a mechanical output of the shaft (e.g., thrust) that can affect the shaft displacement, speed, or acceleration. For example, for a linear motor with a stator that has N phases, the linear motor may be driven by an N-phase inverter having at least 2N switching elements (e.g., some combination of transistors and/or diodes). Some embodiments may use multiple drives that cooperate together to excite the stator. The drives may use various circuit topologies (e.g., half-bridge, full-bridge, resonant or quasi-resonant, transformer-coupled), switch transition techniques (e.g., zero voltage switching, zero current switching, resonant or quasi-resonant switching), and switching modulation strategies (e.g., pulse width modulation, pulse frequency modulation, constant on-time, phase-controlled, etc. . . . ).

Each of the controllers may be open-loop or closed-loop. Closed-loop controllers may be configured to regulate one or more electrical parameter, using bang-bang or other response characteristics. Parameters that may be regulated by the controllers may include, for example, one or more of instantaneous peak current, average current, output voltage, average voltage, output power, for example. In some implementations, the drives may operate from various inputs, which may be characterized as DC (e.g., DC link voltage source, or a rectified and filtered AC) or AC (e.g., 50 or 60 Hz substantially sinusoidal) waveforms. Some embodiments of the drive may receive a substantially DC input voltage generated by a power factor correction (PFC) circuit. The drive may output various output waveforms, such as, for example, a substantially square wave waveform (which may be filtered to produce a substantially smooth output), or a substantially sinusoidal voltage.

In some implementations, the drive may be operated to move the shaft to follow a predetermined trajectory, such as a linear, trapezoidal, or sinusoidal velocity trajectory. In other embodiments, for example, the drive may be operated to apply a predetermined or maximum force or acceleration to the shaft.

A variety of control architecture and implementations may be used for controlling the operations performed by actuators in the high speed assembly system 100. For example, the motor controllers may be commanded directly by a personal computer control application via serial (e.g., RS-232, RS-485, USB, I2C), parallel, or other protocol drivers. The motors may also be individually controlled by a PLC (programmable logic controller) using discrete analog and/or digital output cards, and associated amplifiers and/or power electronic drive sub-systems. Timing sequences may be implemented by a PLC control program, which may be a ladder logic-type program, or other assembled, compiled executable instructions or modules in a library of modules, using suitable procedural (e.g., Fortran) or object-oriented (e.g., C++, Java) languages. Additionally, control via multi-drop networks such as Ethernet, or other proprietary control networks available from PLC manufacturers (e.g., Device Net), may be used. One or more of the controllers in the control system 200 may use one or more processors, such as microcontrollers, microprocessors, digital signal processors (DSP), application specific integrated circuits (ASICs), in combination with a source of executable instructions (e.g., memory elements), and suitable analog, digital, and/or hybrid circuitry.

Some implementations may use one or more sources and/or sinks for inducing fluid flow through the fluid pressure source 202. For example, a vacuum source may be applied to the exhaust port 134 of the linear actuator sub-assembly 130, either alone or in combination with, a pressurized fluid source, such as the pressure source 202, in communication with the pressure cavity 304. Filters, heaters, valves, flow restriction devices, manifolds, and/or other control, distribution, or supply elements may be used in combination with some embodiments.

In some embodiments, the pressurized fluid may be a mixture of one or more fluids, fluids at one or more temperatures, partial pressures, and/or chemical concentrations (e.g., ion concentrations). Illustrative examples of fluid combinations that may be used in the pressurized fluid stream include ambient and chilled air, air with an inert gas (e.g., argon, nitrogen), and air with a cleaning or lubricating chemical additive. In one example, the temperature of the fluid being exhausted through the chimney 132 may be measured; if the exhaust temperature deviates from a predetermined value, for example, the control system 200 may actuate valves to mix pre-cooled air (or other fluid) to regulate the exhaust temperature. For another example, a small amount of cleaning or lubricating substance may be added, either continuously at low levels, regularly, or periodically, to extend the time between required maintenance, or to reduce the mean time between failure.

In some embodiments, a controlled mixture of a substance may be introduced, either continuously or at selected times during an operational cycle, to achieve improved operation. For example, an additive may be injected into the pressure cavity 304 to facilitate release of the separator paper from the mandrel, or to coat the inner surface of the work piece, for example. In some embodiments, an effective concentration of an additive (e.g., catalyst and/or reactant(s)) in the pressurized fluid stream may promote, inhibit, or cause one or more chemical reactions, such as, for example, an oxidation reaction. Additives may also be added to control curing time (e.g., of an epoxy), static electricity build-up, surface adhesion properties, drying time, or the like.

In an alternative to the exemplary embodiment of FIG. 4A, the rotor 428 may incorporate features to form an axially slidable, rotatably coupled (i.e., spline) relationship with the shaft 144. In some embodiments, the rotation of the rotor 428 may provide controlled rotation to the shaft 144, which may replace the wrap pin 142 to form the vertical separator paper into a tube around the mandrel 414. In other applications, the spline coupling to provide axial rotation of the shaft 144 may be used to manipulate and orient objects, for example, at high rates of speed. This may be beneficial for pick and place operations, robotic manipulations, or nozzle applications that may involve printing, painting, coating, or spraying 3-dimensional surfaces, for example. The rotation may also provide rotational operations that require linear force, such as installing screws or setting potentiometers or variable capacitances, for example.

In other embodiments, more than one pressurized annular volume may be defined radially between the outer surface of the shaft 144 and the inner wall of the pressure tube 136. For example, a second pressurized annular volume may be defined axially between one of the bushings 420 or 421 and a third bushing. This second annular volume may be pressurized by pressurized fluid entering via a second pressure tube input port. In some embodiments, some of the apertures 412 may enter this second pressurized annular volume. In some embodiments, a second set of one or more apertures in the shaft 144 may be maintained within the second pressurized annular volume. In some implementations, the second annular volume may be pressurized with the same or a different fluid, which may be at a different temperature, pressure (e.g., positive or negative), and/or chemical concentration. In another example, a low temperature fluid may be circulated through the second annular chamber to provide additional cooling, and an aperture into the shaft 144 may or may not be provided. Some embodiments may include two or more annular volumes that may be pressurized by one or more fluids.

The system 100 may be implemented, at least in part, as a computer system that can be used with embodiments of the invention.

Various embodiments of the invention may be implemented in digital electronic circuitry, or in computer hardware, firmware, software, or in combinations of them. Apparatus can be implemented in a computer program product tangibly embodied in an information carrier, e.g., in a machine-readable storage device or in a propagated signal, for execution by a programmable processor; and methods can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the invention can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The invention can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of analog or digital data communication, including packet-based messages, on a communication network. Examples of communication networks include, e.g., a LAN, a WAN, wireless and/or optical networks, and the computers and networks forming the Internet.

The computer system may be implemented as a distributed computing system, and can include clients and servers. A client and server are generally remote from each other and typically interact through a network. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. For example, advantageous results may be achieved if the steps of the disclosed techniques were performed in a different sequence, if components in the disclosed systems were combined in a different manner, or if the components were replaced or supplemented by other components. The functions and processes (including algorithms) may be performed in hardware, software, or a combination thereof, and some embodiments may be performed on modules or hardware not identical to those described. Accordingly, other embodiments are within the scope of the following claims.

What is claimed is:

1. A manufacturing assembly for manipulating objects, the assembly comprising:
   a structure comprising an internal fluid chamber with a fluid entry port to direct entering fluid toward a controlling aperture and away from a controlled aperture; and
   a valve assembly comprising:
      a guide member; and
      an aperture blocking structure that moves freely in relation to the guide member, wherein the aperture blocking structure normally permits fluid in the internal fluid chamber to be exhausted through the controlling aperture so as to form at the controlled aperture a suction force to attract an object toward the internal fluid chamber, except when the valve assembly is accelerated to create an acceleration force that causes the aperture blocking structure to overcome fluid exhaust forces at the controlling aperture and be forced against and block the passage of fluid through the controlling aperture, in which case fluid within the internal fluid chamber transitions to exhausting through the controlled aperture to repel an object from the internal fluid chamber.

2. The assembly of claim 1, wherein the internal fluid chamber comprises a tube.

3. The assembly of claim 2, wherein the internal fluid chamber comprises a shaft of a linear motor.

4. The assembly of claim 2, wherein the guide member is attached near an end of the internal fluid chamber having the controlling aperture.

5. The assembly of claim 2, wherein in operation the internal fluid chamber is caused to move in a reciprocating motion substantially along a longitudinal axis of the tube.

6. The assembly of claim 1, wherein the controlling aperture comprises a chamfer shaped portion to conform to the aperture blocking structure.

7. The assembly of claim 1, wherein the aperture blocking structure comprises a shock absorbing portion.

8. The assembly of claim 7, wherein the shock absorbing portion comprises one or more small objects.

9. The assembly of claim 8, wherein the one or more small objects comprise one or more containers partially filled with one or more materials selected from the group consisting of plastic, metal, sand, water, and oil.

10. The assembly of claim 8, wherein the one or more small objects comprise containers that are filled with one or more materials to levels of between about 5% and about 90% full.

11. The assembly of claim 1, further comprising means for damping the aperture blocking structure to attenuate bounce upon any impact of the aperture blocking structure against a periphery of the controlling aperture.

12. The assembly of claim 1, wherein the guide member forms a substantially open cage within which the aperture blocking structure is slidably disposed.

* * * * *

UNITED STATES PATENT AND TRADEMARK OFFICE
CERTIFICATE OF CORRECTION

PATENT NO. : 7,546,679 B2  
APPLICATION NO. : 11/411060  
DATED : June 16, 2009  
INVENTOR(S) : William D. Motherway and Stuart M. Davis Page 1 of 1

It is certified that error appears in the above-identified patent and that said Letters Patent is hereby corrected as shown below:

In claim 6, line 2, replace "chamfer" with --chamber--.

Signed and Sealed this

Twenty-eighth Day of July, 2009

JOHN DOLL  
*Acting Director of the United States Patent and Trademark Office*

UNITED STATES PATENT AND TRADEMARK OFFICE
CERTIFICATE OF CORRECTION

PATENT NO. : 7,546,679 B2
APPLICATION NO. : 11/411060
DATED : June 16, 2009
INVENTOR(S) : William D. Motherway and Stuart M. Davis Page 1 of 1

It is certified that error appears in the above-identified patent and that said Letters Patent is hereby corrected as shown below:

Column 26, in claim 6, line 19, replace "chamfer" with --chamber--.

This certificate supersedes the Certificate of Correction issued July 28, 2009.

Signed and Sealed this

Eighteenth Day of August, 2009

David J. Kappos
*Director of the United States Patent and Trademark Office*